US008621376B2

(12) United States Patent
Kim et al.

(10) Patent No.: US 8,621,376 B2
(45) Date of Patent: Dec. 31, 2013

(54) DEVELOPER INTERFACE AND ASSOCIATED METHODS FOR SYSTEM FOR QUERYING AND CONSUMING WEB-BASED DATA

(75) Inventors: Hans Kim, San Francisco, CA (US); Paul Donnelly, Menlo Park, CA (US); Jonathan Trevor, Menlo Park, CA (US)

(73) Assignee: Yahoo! Inc., Sunnyvale, CA (US)

( * ) Notice: Subject to any disclaimer, the term of this patent is extended or adjusted under 35 U.S.C. 154(b) by 916 days.

(21) Appl. No.: 12/607,926

(22) Filed: Oct. 28, 2009

(65) Prior Publication Data
US 2011/0099502 A1    Apr. 28, 2011

(51) Int. Cl.
*G06F 3/00* (2006.01)
(52) U.S. Cl.
USPC .......................... 715/771; 715/744; 707/706
(58) Field of Classification Search
USPC .................. 715/744, 771; 707/706, 731, 708
See application file for complete search history.

(56) References Cited

U.S. PATENT DOCUMENTS

| | | | | |
|---|---|---|---|---|
| 7,836,041 B1* | 11/2010 | Jain et al. | ...................... | 707/706 |
| 2001/0044794 A1* | 11/2001 | Nasr et al. | .......................... | 707/4 |
| 2002/0143742 A1* | 10/2002 | Nonomura et al. | ................ | 707/1 |
| 2003/0212673 A1* | 11/2003 | Kadayam et al. | ................. | 707/3 |
| 2004/0073539 A1* | 4/2004 | Dettinger et al. | ................. | 707/3 |
| 2004/0177068 A1* | 9/2004 | Beretich et al. | .................... | 707/3 |
| 2005/0055336 A1* | 3/2005 | Hui et al. | ........................ | 707/3 |
| 2005/0193097 A1* | 9/2005 | Guthrie et al. | ................. | 709/219 |
| 2006/0106769 A1* | 5/2006 | Gibbs | .............................. | 707/3 |
| 2008/0033956 A1* | 2/2008 | Saha et al. | ........................ | 707/9 |
| 2009/0063437 A1* | 3/2009 | Hendrey et al. | ..................... | 707/4 |
| 2009/0171922 A1* | 7/2009 | Adderly et al. | .................... | 707/4 |
| 2010/0169333 A1* | 7/2010 | Matsuka | ....................... | 707/758 |
| 2010/0281307 A1* | 11/2010 | Ng | .................................. | 714/40 |
| 2011/0082878 A1* | 4/2011 | Nozaki | .......................... | 707/769 |

OTHER PUBLICATIONS

Beatty et al; A Data Model for a Mobile Image Query Service; © 2009; IEEE; pp. 119-126.*
Ben-Shaul; Dynamich Adaptation and Deployment of Distributed Components in Hadas; © 2001; IEEE; pp. 769-789.*
Christensen et al.; Xspect: Bridging Open Hypermedia and XLink; 2005; ACM; pp. 490-499.*

\* cited by examiner

*Primary Examiner* — Linh K Pham
(74) *Attorney, Agent, or Firm* — Martine Penilla Group, LLP

(57) ABSTRACT

A graphical user interface (GUI) for a system for querying web data includes a query entry component defined to receive textual input of a query language (QL) statement. The QL statement identifies one or more QL tables associated with one or more web data sources. The GUI also includes a results data display component defined to visually display results data obtained from execution of the QL statement present in the query entry component. The GUI further includes a QL web service universal resource locator (URL) conveyance component defined to visually and electronically convey a QL web service URL defined to access one or more QL tables identified in the QL statement through the Internet and retrieve direction from the one or more QL tables regarding access and retrieval of data from the one or more web data sources associated with the one or more QL tables.

22 Claims, 25 Drawing Sheets

| QL Statements | | |
|---|---|---|
| QL Statement | Syntax | Description |
| SELECT | SELECT what FROM table WHERE filter [\| function] | Retrieves what data from specified table. The filter is a comparison expression that limits rows returned. The function is an optional function to which the SELECT results can be piped. |
| SHOW TABLES | SHOW TABLES | Gets a list of the QL tables available to QL Web Service. |
| DESC | DESC table | Gets a description of the specified QL table. |
| USE | USE "http://myserver.com/mytables.xml" AS mytable; | Maps a table name (mytable) to the URL (http://myserver.com/mytables.xml) of a QL Open Data Table. |
| SET | SET (name) = (value); | Allows for set up of key value for use within QL Open Data Table. |
| INSERT | INSERT INTO table (key1, key2, key3) VALUES ('value1','value2','value3') | Inserts data into the specified QL table. |
| UPDATE | UPDATE (table) SET field1=value WHERE filter | Updates date in the specified QL table. |
| DELETE | DELETE FROM (table) WHERE filter | Deletes data in the specified QL table. |

| Query Parameters [query_params] for the URLs of the QL Web Service ||||
|---|---|---|---|
| Query Parameter | Required? | Default | Description |
| q | yes | (none) | The QL statement to execute, e.g., SELECT. |
| format | no | xml | The format of the results of the call to the QL Web Service, e.g., xml, json. |
| callback | no | (none) | The name of the JavaScript callback function for JSONP format results. If callback is set and if format=json, then the response format is JSON. |
| diagnostics | no | true | Diagnostic information is returned with the response unless this parameter is set to false. |
| debug | no | (none) | Enables network-level logging of each network call within a QL statement or API query. |

Fig. 1

QL Statements

| QL Statement | Syntax | Description |
|---|---|---|
| SELECT | `SELECT what FROM table WHERE filter [| function]` | Retrieves `what` data from specified `table`. The `filter` is a comparison expression that limits rows returned. The `function` is an optional function to which the SELECT results can be piped. |
| SHOW TABLES | `SHOW TABLES` | Gets a list of the QL tables available to QL Web Service. |
| DESC | `DESC table` | Gets a description of the specified QL `table`. |
| USE | `USE "http://myserver.com/mytables.xml" AS mytable;` | Maps a table name (`mytable`) to the URL (`http://myserver.com/mytables.xml`) of a QL Open Data Table. |
| SET | `SET (name) = (value);` | Allows for set up of key value for use within QL Open Data Table. |
| INSERT | `INSERT INTO table (key1, key2, key3) VALUES ('value1','value2','value3')` | Inserts data into the specified QL `table`. |
| UPDATE | `UPDATE (table) SET field1=value WHERE filter` | Updates date in the specified QL `table`. |
| DELETE | `DELETE FROM (table) WHERE filter` | Deletes data in the specified QL `table`. |

Fig. 2

| comparison_operator Parameters ||
|---|---|
| Operator | Description |
| = | Equal. |
| != | Not equal. |
| > | Greater than. |
| < | Less than. |
| >= | Greater than or equal to. |
| <= | Less than or equal to. |
| IN | Any member of. This operator can be followed by either a sub-select or by a comma-delimited list of values within parentheses. |
| IS [NOT] NULL | Tests for the existence of the field in the results. An IS NULL expression is true if the field is not in the results. |
| [NOT] LIKE | Tests for a string pattern match. The comparison is case-insensitive. The "%" character in the literal indicates zero or more characters. For example, Sys% matches any string starting with Sys. |
| [NOT] MATCHES | Tests for a string pattern match, allowing regular expressions. The comparison is case sensitive. |

Fig. 3

| QL Functions Available for Piping at End of QL SELECT Statement ||||
| --- | --- | --- | --- |
| Function | Argument | Example | Description |
| sort | field [descending] | sort(field="nickname", descending="true") | Sorts the result set according to the specified field (column) in the result set. The default value of the optional descending argument is false. |
| tail | count | tail(count=4) | Gets the last count items (rows). |
| truncate | count | truncate(count=4) | Gets the first count items (rows). |
| reverse | (none) | reverse() | Reverses the order of the items (rows). |
| unique | field | unique(field="Rating.Average Rating") | Removes items (rows) with duplicate values in the specified field (column). The first item with the value remains in the results. |
| sanitize | [field] | sanitize(field='foo') | Sanitizes the output for HTML-safe rendering. To sanitize all returned fields, omit the field parameter. |

Fig. 4

| Local versus Remote Processing in QL Statements | |
|---|---|
| Syntax Element in QL SELECT Statement | Local or Remote |
| Columns or asterisk after the SELECT keyword. | Local |
| Remote limit and offset, indicated by integers in parentheses after the table name. | Remote |
| Remote filter expression in the WHERE clause. The only allowed operator is an equal sign. The value compared is an input key for the back-end web data source. | Remote |
| Local filter expression in the WHERE clause. Various operators are allowed, including LIKE and MATCH. The value compared is a field (column) in the data returned by the query. | Local |
| LIMIT and OFFSET keywords after the WHERE clause. | Local |
| Sort and other functions after the pipe (|) symbol. | Local |

Fig. 5

XML Formatted Results Data

```
<query ... (attributes such as count)>
<diagnostics>
... (sub-elements such as publiclyCallable)

... (data returned by the call to YQL)

</query>
```

Fig. 6

JSON Formatted Results Data

```
{
"query": {
"count": ...
...
"diagnostics": {
"publiclyCallable": ...,
...
},
"results": {
// data returned by call to YQL
...
}
```

Fig. 7

| Attributes of query Element in XML Results Data ||
|---|---|
| Attribute of query Element | Description |
| count | The number of items (rows) returned by the QL statement. In an XML formatted response, count is the number of sub-elements in the results element. |
| created | The date and time the response was created. |
| lang | The locale for the response. |
| updated | The date and time this response was last updated. |
| uri | The URI where the same set of results can be retrieved. This URI is the same as the URI specified to run the QL statement. |

Fig. 8

| Sub-Elements of diagnostics Element in XML Results Data ||
|---|---|
| Sub-Element of diagnostics Element | Description |
| publiclyCallable | True if the table is public data. False if the table is private data. Authorization is required for private data. |
| url | The URL of the Web Service called by the QL Web Service to get the data. |

Fig. 9

QL Statement

```
select Title from local.search where zip='95124' and query='sushi' limit 1
```

XML Formatted Data

```
<?xml version="1.0" encoding="UTF-8"?>
<query xmlns:yahoo="http://www.yahooapis.com/v1/base.rng" yahoo:count="1"
yahoo:created="2009-10-27T11:17:06Z" yahoo:lang="en-US"
yahoo:updated="2009-10-27T11:17:06Z" yahoo:uri="http://query.yahooapis.com/
v1/
yql?q=select+Title+from+local.search+where+zip%3D%2795124%27+and+query%3D%2
7sushi%27+limit+1">
    <diagnostics>
        <publiclyCallable>true</publiclyCallable>
        <url execution-time="1467"><![CDATA[http://local.yahooapis.com/
LocalSearchService/V3/
localSearch?zip=95124&query=sushi&start=1&results=10]]></url>
        <user-time>1469</user-time>
        <service-time>1467</service-time>
        <build-version>3559</build-version>
    </diagnostics>

<Result xmlns="urn:yahoo:lcl">
            <Title>Ariake Sushi</Title>
        </Result>

</query>
```

JSON Formatted Data Transformed from XML

```
cbfunc({
 "query": {
  "count": "1",
  "created": "2009-10-27T11:17:29Z",
  "lang": "en-US",
  "updated": "2009-10-27T11:17:29Z",
  "uri": "http://query.yahooapis.com/v1/
yql?q=select+Title+from+local.search+where+zip%3D%2795124%27+and+query%3D%2
7sushi%27+limit+1",
  "diagnostics": {
   "publiclyCallable": "true",
   "url": {
     "execution-time": "412",
     "content": "http://local.yahooapis.com/LocalSearchService/V3/
localSearch?zip=95124&query=sushi&start=1&results=10"
   },
   "user-time": "415",
   "service-time": "412",
   "build-version": "3559"
  },
  "results": {
   "Result": {
    "Title": "Ariake Sushi"
   }
  }
 }
});
```

Fig. 10

Attributes of table Element

| Attribute | Value(s) | Description |
|---|---|---|
| `xmlns` | URL | The XML namespace related to this QL Open Data Table definition. |
| `securityLevel` | enumeration, `any` / `app` / `user` | The authorization level required to access.<br>`any`: Anonymous access; any user can access this table.<br>`app`: 2-legged OAuth; involves authorization without access to private user data.<br>`user`: 3-legged OAuth; involves authorization of access to user data. |
| `https` | boolean, `true` or `false` | If true, the table is only available if the user is connected via HTTPS. If missing or false, either HTTP or HTTPS connections are acceptable. |

Fig. 11A

| Access Availability Based on securityLevel Attribute |||| 
|---|---|---|---|
| Security of Table (access attribute) | Anonymous/ No Authorization | 2-legged OAuth | 3-legged OAuth/ cookie |
| any | yes | yes | yes |
| app | no | yes | yes |
| user | no | no | yes |

Fig. 11B

Attributes of meta Element

| Attribute | Description | Notes |
|---|---|---|
| sampleQuery | A sample query that users can run to get output from this table. | {table} should be used in place of the table name, so that the sample can run when used in different namespaces. Multiple sampleQuery elements may occur. Each sampleQuery may have a description attribute that contains a description about the sample. |
| documentationURL | Additional information about this table or the select called by the table can be found here. | More than on documentationURL element may be included for each table. |
| description | Plain text description about the table. | A description of the table. |
| author | Information regarding the author of this Web Service. | Examples of author information include an unformatted email address, name, or other related information. |

Fig. 12

| Attributes of bindings/select Element | | |
|---|---|---|
| Attribute | Value(s) | Description |
| itemPath | URLs | A dot-path that points to where the repeating data elements occur in the response format. These are the "rows" of the table. |
| produces | enumeration, XML / JSON | The type of data coming back from the Web Service. |

Fig. 13

| | select | insert | update | delete |
|---|---|---|---|---|
| key | yes | yes | yes | yes |
| value | no | yes | yes | no |
| map | yes | yes | yes | yes |

Fig. 14

| Attributes of key, value, and map Elements ||||
| --- | --- | --- | --- |
| Attribute | Value(s) | Supported Keywords | Notes |
| `id` | string | select, insert, update, delete | The name of the key. This represents what the user needs to provide in the WHERE clause. |
| `as` | string | select, insert, update, delete | The alias of the key used in QL statements. |
| `type` | string | select, insert, update, delete | The type of data coming back from the Web Service. |
| `required` | boolean | select, insert, update, delete | A boolean that answers the question: Is this key required to be provided in the WHERE clause on the left-hand side of an equality statement? If not set, any key is optional. |
| `paramType` | enumeration | select, insert, update, delete | Determines how this key is represented and passed on to the Web Service:<br><br>- `query`: Add the `id` and its value as a `id=value` query string parameter to the URL.<br><br>-`matrix`: Add the `id` and its value as a `id=value` matrix parameter to the URL path.<br><br>-`header`: Add the `id` and its value as a `id:value` header to the URL request.<br><br>-`path`: Substitute all occurrances of {`id`} in the URL string with the value of the `id`. Not necessarily only in the path.<br><br>-`variable`: Use this key or field as a variable to be used within the `execute` element instead of being used to format or form the URL. |
| `default` | string | select, insert, update, delete | This value is used if one is not specified in the SELECT statement. |
| `private` | boolean | select, insert, update, delete | Hide this key's value to the user (in both "`desc`" and "`diagnostics`"). Useful for parameters like `appid` and `keys`. |
| `const` | boolean | select, insert, update, delete | A boolean that indicates whether the `default` attribute must be present and cannot be changed by the end user. Constant `keys` are not shown in `desc[table]`. |
| `batchable` | boolean | select, update, delete | A boolean which answers the question: Does this select and URL support multiple key fetches/requests in a single request (batched fetching)? |
| `maxBatchItems` | integer | select, update, delete | How many requests should be combined in a single batch call. |

Fig. 15

Attributes of pagesize, start, total, and nextpage Elements

| Attribute | Value(s) | Description |
|---|---|---|
| pagesize element | | |
| max | integer | The maximum size of the requested page. If the total requested is below the max pagesize, then the pagesize will be the total requested. Otherwise, the max pagesize will be the size of the page requested. |
| id | string | The name of the parameter that controls the page size. |
| matrix | boolean | A boolean that answers the question: Is the parameter matrix style (part of the URI path; delimited), or query parameter style? |
| start element | | |
| default | integer | The starting item number (generally 0 or 1); for paging style this value defaults to 1. |
| id | string | The name of the parameter that controls the starting page/offset. |
| matrix | boolean | A boolean that answers the question: Is the parameter matrix style (part of the URI path; delimited), or query parameter style? |
| total element | | |
| default | integer | The number of items that come back by "default" through the QL Web Service if the () syntax is not used when querying the table. |
| nextpage element | | |
| path | string | The path to the next page of results. |

Fig. 16

```xml
<?xml version="1.0" encoding="UTF-8"?>
<table xmlns="http://query.yahooapis.com/v1/schema/table.xsd">
<meta>
<author>Yahoo! Inc.</author>
<documentationURL>http://www.flickr.com/services/api/
flickr.photos.search.html</documentationURL>
<sampleQuery>select * from {table} where has_geo="true" and text="san
francisco"</sampleQuery>
</meta>
<bindings>
<select itemPath="rsp.photos.photo" produces="XML">
<urls>
<url
env="all">http://api.flickr.com/services/rest/
?method=flickr.photos.search</url>
</urls>
<paging model="page">
<start id="page" default="0" />
<pagesize id="per_page" max="250" />
<total default="10" />
</paging>
<inputs>
<key id="woe_id" type="xs:string" paramType="query" />
<key id="user_id" type="xs:string" paramType="query" />
<key id="tags" type="xs:string" paramType="query" />
<key id="tag_mode" type="xs:string" paramType="query" />
<key id="text" type="xs:string" paramType="query" />
<key id="min_upload_date" type="xs:string" paramType="query"
/>
<key id="max_upload_date" type="xs:string" paramType="query"
/>
<key id="min_taken_date" type="xs:string" paramType="query" />
<key id="max_taken_date" type="xs:string" paramType="query" />
<key id="license" type="xs:string" paramType="query" />
<key id="privacy_filter" type="xs:string" paramType="query" />
<key id="bbox" type="xs:string" paramType="query" />
<key id="accuracy" type="xs:string" paramType="query" />
<key id="safe_search" type="xs:string" paramType="query" />
<key id="content_type" type="xs:string" paramType="query" />
<key id="machine_tags" type="xs:string" paramType="query" />
<key id="machine_tag_mode" type="xs:string" paramType="query"
/>
<key id="group_id" type="xs:string" paramType="query" />
<key id="contacts" type="xs:string" paramType="query" />
<key id="place_id" type="xs:string" paramType="query" />
<key id="media" type="xs:string" paramType="query" />
<key id="has_geo" type="xs:string" paramType="query" />
<key id="lat" type="xs:string" paramType="query" />
<key id="lon" type="xs:string" paramType="query" />
<key id="radius" type="xs:string" paramType="query" />
<key id="radius_units" type="xs:string" paramType="query" />
<key id="extras" type="xs:string" paramType="query" />
<key id="api_key" type="xs:string" const="true" private="true"
paramType="query" default="45c53f8...d5f645"/>
</inputs>
</select>
</bindings>
</table>
```

Fig. 17

```xml
<?xml version="1.0" encoding="UTF-8"?>
<table xmlns="http://query.yahooapis.com/v1/schema/table.xsd">
<meta>
<sampleQuery>select * from {table} where publisher='digg' and
action='dugg'</sampleQuery>
</meta>
<bindings>
<select itemPath="activities.activity" produces="XML" >
<urls>
<url
env="all">https://prod.gnipcentral.com/publishers/{publisher}/
notification/{bucket}.xml</url>
</urls>
<inputs>
<key id="publisher" type="xs:string" paramType="path"
required="true" />
<key id="bucket" type="xs:string" paramType="path"
required="true" />
<key id="Authorization" type="xs:string" paramType="header"
const="true" default="Basic eXFsLXF1ZXN...BpcGVz" />
</inputs>
</select>
<select itemPath="activities.activity" produces="XML" useProxy="true"
auth="callback">
<urls>
<url
env="all">https://prod.gnipcentral.com/publishers/{publisher}/
notification/current.xml</url>
</urls>
<inputs>
<key id="publisher" type="xs:string" paramType="path"
required="true" />
<key id="Authorization" type="xs:string" paramType="header"
const="true" default="Basic eXFsLXF1ZXN0a...BpcGVz" />
</inputs>
</select>
</bindings>
</table>
```

Fig. 18

Enter Query

Select * from mytable where badparam='badvalue'

2101

O NOES! Your query returned the following error:
   Invalid id(s) in where clause        2601

┌─ 2109                                  2103 ─┐  ┌──────┐
   │ XML │  │ JSON │ ─┐ 2107                      │  │ Test │
                                                     └──────┘

```
<?xml version="1.0" encoding="UTF-8"?>
   <error yahoo:uri="http://query.yahooapis.com/v1/errors/500/server-error"
xmlns:yahoo="http://www.yahooapis.com/v1/base.rng">
      <description>Invalid id(s) badparam in where clause</description>
   </error>
```

2105

┌──────┐ ─┐ 2123
Web Service URL            │ Copy │
                               └──────┘

Fig. 26

DEVELOPER INTERFACE AND ASSOCIATED METHODS FOR SYSTEM FOR QUERYING AND CONSUMING WEB-BASED DATA

CROSS-REFERENCE TO RELATED APPLICATIONS

This application is related to U.S. patent application Ser. No. 12/607,804, filed on even date herewith, and entitled "System for Querying and Consuming Web-Based Data and Associated Methods," which is incorporated herein by reference in its entirety.

BACKGROUND OF THE INVENTION

In today's web (internet) universe, there exist thousands of web services and web data sources that provide valuable data. The various web services and web data sources can be defined using many different data types and formats, which can be either loosely structured or well structured. For example, web data sources may exist in formats such as HTML, XML, JSON, RSS, Atom, microformat, among others. In order for an application developer (developer) to access and utilize data from a given web service/data source, the developer is required to have a detailed understanding of the given web service/data source implementation, such as its particular data types and formats. This can require a developer to spend copious amounts of time learning a particular web service/data source implementation, which can hinder application development.

Additionally, the numerous available web services/data sources can exist in isolation relative to the population of web services/data sources. This requires the developer to perform separate and multiple processes to access and utilize data from multiple web services/data sources. Moreover, the developer may only be able to access data from a given web service/data source in its entirety, which will often require the developer to filter, combine, tweak, and/or shape data following its retrieval from a given web service/data source.

In view of the foregoing, there is a need for improved systems and methods by which a developer can access and utilize data from multiple and diverse web services and web data sources.

SUMMARY OF THE INVENTION

In one embodiment, a graphical user interface (GUI) for a system for querying web data is disclosed. The GUI includes a query entry component visually rendered in a display of computer system. The query entry component is defined to receive textual input of a query language (QL) statement. The QL statement identifies one or more QL tables associated with one or more web data sources. The GUI also includes a results data display component visually rendered in the display. The results data display component is defined to visually display results data obtained from execution of the QL statement present in the query entry component. The GUI further includes a QL web service universal resource locator (URL) conveyance component visually rendered in the display. The QL web service URL conveyance component is defined to visually and electronically convey a QL web service URL defined to access one or more QL tables identified in the QL statement through the Internet, and retrieve direction from the one or more QL tables regarding access and retrieval of data from the one or more web data sources associated with the one or more QL tables, as identified in the QL statement.

In another embodiment, a method is disclosed for operating a GUI for a system for querying web data. The method includes entering a QL statement in a query entry window of the GUI. The method also includes generating a QL web service URL defined to execute the QL statement. The method further includes executing the QL statement through a QL web service underlying the GUI via the generated QL web service URL. Also, results data generated by execution of the QL statement is displayed in a results display window of the GUI. And, the QL web service URL defined to execute the QL statement is displayed in a URL display window of the GUI.

Other aspects and advantages of the invention will become more apparent from the following detailed description, taken in conjunction with the accompanying drawings, illustrating by way of example the present invention.

BRIEF DESCRIPTION OF THE DRAWINGS

FIG. 1 shows a table of query parameters [query_params] for the URLs of the QL Web Service, in accordance with one embodiment of the present invention;

FIG. 2 shows a table of QL statements that can be submitted to the QL Web Service via the query parameter [q=] in the URL of the QL Web Service, in accordance with one embodiment of the present invention;

FIG. 3 shows a table of possible comparison_operator parameters that can be specified between the field and literal parameters, in accordance with one embodiment of the present invention;

FIG. 4 shows a table of possible QL functions that can be appended to a QL SELECT statement, in accordance with one embodiment of the present invention;

FIG. 5 shows a table which identifies whether an element in a QL SELECT statement is processed locally or remotely, in accordance with one embodiment of the present invention;

FIG. 6 shows the basic structure of the XML formatted output data in the response generated by a call to the QL Web Service, in accordance with one embodiment of the present invention;

FIG. 7 shows the basic structure of the JSON formatted output data in the response generated by a call to the QL Web Service, in accordance with one embodiment of the present invention;

FIG. 8 shows a table that lists the attributes of the query element in the XML formatted output data returned by the QL Web Service, in accordance with one embodiment of the present invention;

FIG. 9 shows a table that lists the XML formatted sub-elements of the diagnostics element, in accordance with one embodiment of the present invention;

FIG. 10 shows an example listing of XML formatted data and corresponding JSON formatted data, where the JSON formatted data has been transformed from the XML formatted data according to the rules listed above, in accordance with one embodiment of the present invention;

FIG. 11A shows a listing of attributes available for specification in association with the table element, in accordance with one embodiment of the present invention;

FIG. 11B shows a table that lists whether access is available depending on the value in the securityLevel attribute;

FIG. 12 shows a listing of attributes available for specification in association with the meta sub-element, in accordance with one embodiment of the present invention;

FIG. 13 shows a listing of attributes available for specification in association with the bindings/select element, in accordance with one embodiment of the present invention;

FIG. 14 shows a table indicating which keywords (select, insert, update, delete) support the key, value, and map elements, in accordance with one embodiment of the present invention;

FIG. 15 shows a table listing the attributes available within the key, value, and map elements, in accordance with one embodiment of the present invention;

FIG. 16 shows a table listing the attributes available within the pagesize, start, total, and nextpage elements, in accordance with one embodiment of the present invention;

FIG. 17 shows an example QL Open Data Table defined to tie into the Flickr API and allow the QL Web Service to retrieve data from a Flickr photo search, in accordance with one embodiment of the present invention;

FIG. 18 shows an example QL Open Data Table defined to the Gnip API to retrieve activities from a Publisher, which in this example is Digg, in accordance with one embodiment of the present invention;

FIG. 26 shows the QL GUI (without the sidebar display for clarity) upon discovery of a query error, in accordance with one embodiment of the present invention.

DETAILED DESCRIPTION

Figure 19:
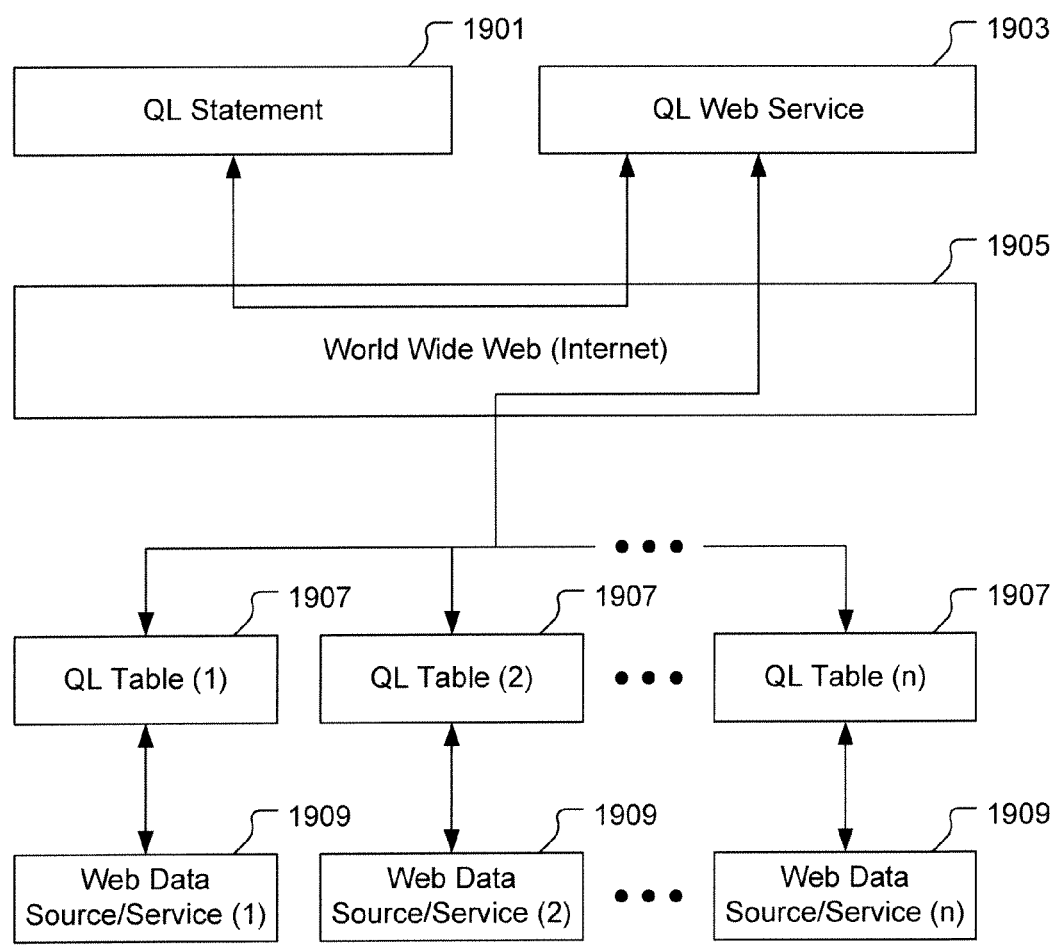
FIG. 19 shows an architectural view of the QL Web Service system, in accordance with one embodiment of the present invention.

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

A Query Language (QL) Web Service is disclosed herein that enables developers and their applications to query, filter, and combine data from different sources across the Internet. In one embodiment, the QL Web Service is referred to as the Yahoo! Query Language (YQL) Web Service. However, in other embodiments, the QL Web Service can be referred to by other names. It should be understood that the QL Web Service is a web service that is accessible through the Internet via a URL, and that can be interfaced with using a well-defined language to effect acquisition and consumption of data from one or more web services and/or web data sources.

The QL Web Service operates within a system that includes: 1) the QL Web Service, 2) one or more back-end web data sources/services, and 3) one or more QL tables respectively associated with the one or more back-end web data sources/services. The back-end web data sources/services represent entities that exist in the Internet realm that contain data of interest of various types and that are accessible through the Internet via a URL. For ease of discussion, the back-end web data sources/services are referred to hereafter as web data sources. It should be understood, however, that the term web data source as used herein refers to either data or a service that is accessible through the Internet via a URL.

The QL table is a file which includes information that can be read and understood by the QL Web Service to inform the QL Web Service on how to access and interact with a particular web data source for which the QL table is defined. The QL table serves as a mediator and interpreter between the QL Web Service and the particular web data source for which the QL table is defined. It should be understood that the QL Web Service relies upon the QL table to provide information regarding how to access a web data source, what data is available at the web data source and the data format(s), how to get data from the web data source, and how to manipulate data at the web data source. Therefore, the QL Web Service itself is not hard-coded with knowledge about any particular web data source, but rather the QL Web Service is defined to obtain and understand information from a mediating QL table with regard to interfacing and interacting with a particular web data source. Also, it should be understood that the data that is obtained by the QL Web Service is actually obtained from the back-end web data source, and the QL table provides the binding between the QL Web Service and back-end data source that enables that data to be obtained.

Each QL table for a given web data source is defined in a format that is understood by the QL Web Service. In one embodiment, QL tables are defined in an XML format. However, it should be understood that in other embodiments, the QL tables can be defined in different formats, so long as the QL Web Service is capable of understanding the information contained within the QL tables. The web data sources that are accessed by the QL Web Service can be defined in essentially any format. The binding provided by the QL table between the QL Web Service and a particular web data source informs the QL Web Service as to what type(s) of data are present within the particular web data source. Using the binding information gleaned from the QL table, the QL Web Service knows how to access the data present at the particular web data source in its native format. Once the QL Web Service accesses and retrieves the data from the web data source in its native format, the QL Web Service converts the retrieved data into an internal format for processing within the QL Web Service. In one embodiment, the internal format is an XML format. However, it should be understood that is other embodiments, the QL Web Service can be defined to use any one of a number of different internal formats.

Based on user-specified controls and parameters, the QL Web Service is defined to generate a set of results data from the various data that is retrieved from the one or more back-end web data sources. The QL Web Service is defined to convey the set of results data in either of multiple output formats as specified by the user of the QL Web Service. Specifically, the QL Web Service is defined to convert the set of results data from the internal format used by the QL Web Service into a user-specified output format. In one embodiment, the user-specified output format is either an XML format or a JSON format. However, it should be understood that in other embodiments the QL Web Service can be defined to convey the set of results data in essentially any known output format, as selected by the user of the QL Web Service.

Before delving into the more detailed description of the QL Web Service and the language (QL) it exposes for its use, a few features of QL Web Service's utility should be understood and appreciated. It should be understood and appreciated that a user of the QL Web Service does not need to know either the URLs of any web data source to be accessed or the complexities associated with calling the URLs of any web data source. Each QL table that is associated with a particular web data source provides the knowledge to the QL Web Service regarding the URLs of the particular web data source and the complexities associated with calling the URLs of the particular web data source. The QL Web Service in turn abstracts this detailed and complex information regarding the particular web data sources URLs to the user of the QL Web Service. More specifically, the QL exposed by the QL Web Service allows the user to specify in a single statement one or more QL tables to be operated upon, one or more parameters to be operated upon within the specified QL table(s), and one or more operations to be performed on the specified parameter(s). It should be appreciated that the user does not need to know anything about the URLs that are associated with the web data sources represented by the one or more QL tables. This feature will become more apparent in the description to follow.

Additionally, a feature of the QL Web Service to be appreciated throughout the description herein is that the QL Web Service provides for joining of data from different web data sources, regardless of ownership of the different web data sources, and regardless of how the different web data sources are provisioned and made accessible through the Internet. The web data sources that can be accessed by the QL Web Service, by way of appropriately defined QL tables, can be owned by any entity, can be located anywhere in the world, and can include data of any type. Thus, the QL Web Service provides for joining web data sources together, regardless of their diversity in ownership, location, and/or format, to produce a combined set of results data. Although the above-mentioned features of the QL Web Service are quite substantial, it should be understood that the QL Web Service provides many additional features and services, as will be apparent from the following more detailed description of the QL Web Service and its associated query language.

The QL Web Service query language (QL) includes a number of different statements that can be submitted through an appropriately formatted URL to the QL Web Service to access one or more data sources on the Internet, acquire data from the data source, transform the acquired data, and output the set of results data in a selected format, such as XML or JSON format. The QL Web Service can access essentially any type of data source, including but not limited to Yahoo! Web Services, other web services, and web content in formats such as HTML, XML, JSON, RSS, Atom, and microformat, among others.

The QL Web Service is accessed through a URL which is defined to include a QL statement for acquiring and/or manipulating data at one or more web data sources. In one embodiment, the QL Web Service has two URLs, wherein one URL allows access to public data and the other URL allows access to both public and private data. For example, in one embodiment, the following URL allows access to public data, which does not require authorization:
http://query.yahooapis.com/v1/public/yql?[query_params]

Also by way of example, the following URL requires authorization, e.g., by OAuth, and allows access to both public and private data:
http://query.yahooapis.com/v1/yql?[query_params]

It should be understood that the provider of data at a web data source may implement some type of protection on the data such that authorization of some sort is required to access the data. If a web data source is protected, the QL table associated with the web data source is defined to specify the type of protection implemented and the requirements for accessing the web data source. For example, when the web data source requires OAuth credentials, the associated QL table will specify that OAuth credential are required. Then, the user of the QL Web Service, having seen the QL table description, will know that appropriate OAuth credentials must be provided to access the web data source.

FIG. 1 shows a table of query parameters [query_params] for the URLs of the QL Web Service, in accordance with one embodiment of the present invention. It should be understood that the QL Web Service is not limited to the query parameters shown in FIG. 1. Other embodiments of the QL Web Service may include additional query parameters that are not shown in FIG. 1.

FIG. 2 shows a table of QL statements that can be submitted to the QL Web Service via the query parameter [q=] in the URL of the QL Web Service, in accordance with one embodiment of the present invention. It should be understood that the QL statements are not limited those shown in FIG. 2. Other embodiments of the QL Web Service may provide for use of additional QL statements that are not shown in FIG. 2.

As indicated in FIG. 2, the QL statements operate on QL tables. As discussed above, the QL table is a file which includes information that can be read and understood by the QL Web Service to inform the QL Web Service on how to access and interact with a particular web data source. The web data source for which the QL table is defined often contains very large collections of structured data. The Yahoo! QL Web Service includes an extensive list of built-in QL tables that cover a wide range of Yahoo! Web Services and access to off-network data. Additionally, the QL Web Service provides for creation and use of QL Open Data Tables to bind any web data source to the QL Web Service, thereby enabling access to and consumption of the web data source through the QL Web Service.

As mentioned above, some web data sources may implement access protection. A QL table associated with a protected web data source that requires access authorization in some form is referred to as a private QL table. A QL table associated with a non-protected web data source that does not require access authorization is referred to as a public QL table. An application can access a public QL table through an endpoint that does not require authentication. For example, in one embodiment, an application can access a public QL table through the /v1/public/yql endpoint of the Yahoo! QL Web Service, which does not require authorization. In another example, an application can access a private QL table through the /v1/yql endpoint of the Yahoo! QL Web Service by supplying appropriate credentials, such as OAuth credentials. OAuth is an open standard that allows Yahoo! users to share their private resources stored on Yahoo! with developers without having to hand out their username and password.

The Yahoo! QL Web Service supports two-legged and three-legged OAuth. The two-legged OAuth is an OAuth authorization between two parties: (1) an application (the Consumer) and (2) the public data source (the Service Provider). The public data source can be a Web service or Web feeds such as RSS or Atom feeds. A public data source does not require authorization from the end user of the application. The three-legged OAuth is an OAuth authorization between three parties: (1) the end user (User), (2) the application (the Consumer), and (3) the private data source (the Service Provider). An application that uses the Yahoo! Social Directory APIs for example, need authorization by the end user to access private social data.

It should be understood that a QL table referenced herein may be either a private QL table or a public QL table depending on the web data source with which it is associated. However, regardless of the whether the QL table is public or private, the QL Web Service is defined to utilize the QL table in the same manner such that the QL table serves as a mediator between the QL Web Service and the associated web data source.

The QL statements of FIG. 2 can be run in several ways. In one embodiment, the QL statements can be run in a Yahoo! QL Console, which is a QL Web Service user interface that is executable within a web browser. The Yahoo! QL Console is described below starting at FIG. 21A.

In another embodiment, a web application can use an HTTP request, such as an HTTP GET request for example, when running SELECT statements, wherein the QL statement is specified as a query parameter of the QL Web Service URL. In one embodiment, a web application can use an HTTP GET, PUT, or DELETE request for the QL statements INSERT, UPDATE, and DELETE, respectively. One exception is when a JSONP callback is specified in the QL statement. In an example embodiment of this case, an HTTP GET request can be used with a callback query parameter specified on the GET URI. In yet another embodiment, a web application that uses the PHP SDK can call a query method of the YahooSession class.

QL Statement: SELECT

The SELECT statement of QL retrieves data from one or more QL tables which reference respective web data sources. The QL Web Service fetches data from a back-end web data source, transforms the data as directed, and outputs the data in a specified format. In one embodiment, the specified output format is either XML or JSON format. In this embodiment, output data is presented in a tabular arrangement in which table rows are represented as repeating XML elements or JSON objects, and table columns are XML sub-elements or attributes, or JSON name-value pairs. It should be understood, however, that in other embodiments the QL Web Service can be defined to output results in essentially any format.

The QL SELECT statement has the following syntax:
SELECT what FROM table WHERE filter [| function]

The what clause contains the data fields to retrieve. The data fields correspond to the XML elements or JSON objects that will be conveyed in the output data returned by the QL Web Service based on execution of the SELECT statement. Therefore, the data fields in the what clause represent the columns in the tabular arrangement of output results returned by the QL Web Service. An asterisk (*) in the what clause means all data fields. The table parameter is a QL table (either a QL pre-defined, i.e., built-in, table or a QL Open Data Table) that binds a web data source to the QL Web Service. The filter parameter is a comparison expression that limits the data rows in the output data returned by the SELECT statement. The output data results of the SELECT statement can be piped, via the pipe symbol ("|"), to an optional function, such as a sort function. In one embodiment of QL, statement keywords such as SELECT and WHERE are case-insensitive. However, table and field names are case sensitive. In string comparisons, the values are case sensitive. String literals are enclosed in quotes. Either double or single quotes are allowed.

The QL Web Service includes a projection feature by which a vertical slice, i.e., projection, of the web source data referenced in the associated QL table can be queried. Specifically, data fields can be specified by name in the what clause following the SELECT keyword. Multiple data fields can be delimited by commas. For example,

```
SELECT lastUpdated, itemurl FROM social.updates WHERE
  guid=me
``` will return data from the web data source corresponding to the data fields lastUpdated and itemurl from the row in QL table social.updates that has guid=me.

All data fields can be specified by an asterisk (*). For example,
SELECT*FROM social.updates WHERE guid=me
will return data from the web data source corresponding to all the data fields in QL table social.updates that has guid=me If the data fields in the result set contain data sub-fields, the data sub-fields can be specified by using periods (dots) as delimiters. This format is referred to as "dot-style syntax." For example, for the social.profile QL table, to get only the imageUrl data sub-field of the image data field, the following can be specified:
SELECT image.imageUrl FROM social.profile WHERE guid=me The following lines show part of the output results returned by the QL Web Service (in XML format) for this SELECT statement. Note that only the imageUrl data subfield is returned.

```

<profile
xmlns="http://social.yahooapis.com/v1/schema.rng">
<image>
<imageUrl>http://l.yimg.com/us.yimg.com/i/identity/nopi
c__192.gif</imageUrl>
</image>
</profile>

```

If one or more non-existent data fields is specified in the what clause, an HTTP response code is returned, such as 200 OK. If none of the data fields in the what clause exist, the result set is empty. That is, zero rows are returned.

The filter in the WHERE clause determines which rows are returned by the SELECT statement. In other words, the filter represents the rows in the tabular arrangement of output results returned by the QL Web Service. The filter in the following statement, for example, returns rows only if the text field matches the string Barcelona:
SELECT*FROM flickr.photos.search WHERE text='Barcelona'

In one embodiment, the QL has two types of filters: remote and local. These filter types are differentiated by where the filtering takes place relative to the QL Web Service. With a remote filter, the filtering takes place at the back-end web data source called by the QL Web Service. A remote filter has the following syntax:
input_key=literal The input key is a parameter that QL passes to the back-end web data source. The literal is a value (either a string, integer, or float). Only the equality operator is allowed in a remote filter. For example, in the following statement, the input key is photo_id:
SELECT*FROM flickr.photos.info WHERE photo_id='2186714153'

For this SELECT statement, the QL Web Service calls the Flickr Web Service, passing photo_id as follows:

```
http://api.flickr.com/services/rest/?method=flickr.photos.ge
    tInfo&photo_id='2186714153'
```

Most QL tables require the SELECT statement to specify a remote filter, which requires an input key. Often, the input key is not one of the data fields included in the output results returned by a SELECT statement. To see which input keys are allowed or required, the DESC statement can be run for the QL table, and the key element of the results can be noted. For example, as shown in the following lines, the results of DESC flickr.photos.info show that the input key photo_id is required:

```

...
<select>
<key name="secret" type="xs:string"/>
<key name="photo_id" required="true" type="xs:string"/>
</select>
...

```

Multiple remote filters can be combined with the boolean AND or OR operators. For example:

```
SELECT * FROM flickr.photos.info WHERE photo_id='2186714153'
or photo_id='3502889956'
```

The SELECT statements for some QL tables may include multiple remote filters. For example:

```
SELECT * FROM local.search WHERE zip='94085' and
    query='pizza'
```

The QL Web Service also performs local filtering on the data it retrieves from the back-end web data source. A local filter has the following syntax:
field comparison_operator literal The field parameter specifies the name of a data field in the output of the QL Web Service, e.g., the field parameter corresponds to an XML element or a JSON object in the output data to be conveyed by the QL Web Service. To specify a data sub-field, the containing data fields are separated with periods. For example, the data sub-field AverageRating is specified as Rating.AverageRating where the data field Rating includes the data sub-field AverageRating. The literal parameter is either a quoted string, an integer, or a float.

FIG. 3 shows a table of possible comparison_operator parameters that can be specified between the field and literal parameters, in accordance with one embodiment of the present invention. It should be understood that the QL Web Service is not limited to the comparison_operator parameters shown in FIG. 3. Other embodiments of the QL Web Service may include additional comparison_operator parameters that are not shown in FIG. 3.

In the following example QL statement, the QL Web Service is directed to get data from the flickr.photos.interestingness QL table, then apply the local filter title='moon':

```
select * from flickr.photos.interestingness where
    title='moon'
```

In the following example QL statement, the local filter checks that the value of the title field starts with the string Chinese or CHINESE:

```
select * from flickr.photos.interestingness where title like
    'Chinese%'
```

In the following example QL statement, the local filter contains a regular expression that checks for the substring blue:

```
select * from flickr.photos.interestingness where title
    matches '.*blue.*'
```

In the following example QL statement, the local filter is specified to return recent photos with the IDs specified in the parentheses:

```
select * from flickr.photos.recent where id in
    ('3630791520', '3630791510', '3630791496')
```

Local and remote filter expressions can be combined with the boolean AND and OR operators. In one embodiment, the AND operator has precedence over the OR operator. To change precedence, expressions can be enclosed in parentheses. An example QL statement that combines filters is as follows:

```
select * from local.search where query="sushi" and
    location="san francisco, ca" and Rating.AverageRating="4.5"
```

In the above example, the first two filters are remote expressions because query and location are input keys. The third filter in the above example that contains the data field Rating.AverageRating, is a local filter.

Based on the foregoing, it should be understood that a remote filter is represented by a key word in an equality expression. The remote filter name, i.e., key word, is defined in the QL table and may or may not directly correspond to some term known by the back-end data source associated with the QL table. However, the QL table defines what remote filters can be provided, what the key words are for those remote filters, and how the remote filters are applied to the URL that gets created to call the back-end data source. The remote filter is passed to the back-end data source and is applied at the back-end data source. The local filter is represented by a data field in a comparison expression. The data field is a field name defined in the QL table. The data field is not known by the back-end data source. The data field is used by the QL Web Service to identify data during operation on the data within the QL Web Service and within the output data results conveyed by the QL Web Service.

It is possible to join data from different web data sources by specifying their respective QL tables using a sub-select form of the QL statement. As previously mentioned, the QL Web Service provides for joining of data from different web data sources, regardless of ownership of the different web data sources, and regardless of how the different web data sources are provisioned and made accessible through the Internet. The web data sources that can be accessed by the QL Web Service, by way of appropriately defined QL tables as specified in a sub-select form of the QL statement, can be owned by any entity, can be located anywhere in the world, and can include data of any type. Thus, the sub-select feature of the QL Web Service provides for joining web data sources together, regardless of their diversity in ownership, location, and/or format, to produce a combined set of results data.

The sub-select provides input for the IN operator of the outer SELECT statement. The values in the outer SELECT statement can be either input keys known the back-end web data source (remote filters) or data fields known to the QL Web Service by way of their definition in the QL table (local filters). For example, by using a sub-select, the following QL statement returns the profiles of all of the connections (friends) of the user currently logged in to Yahoo!:

```
select * from social.profile where guid in (select guid from
social.connections where owner_guid=me)
```

In the example above, the QL statement joins the social.profile and social.connection QL tables on the values of the GUIDs. More specifically, the inner SELECT, which follows the word IN, returns the GUIDs for the user's connections. For each of these GUIDs, the outer SELECT returns the profile information.

QL tables can also be joined on multiple keys. In the following example, the local.search and geo.places tables are joined on two keys:

```
select * from local.search where (latitude,longitude) in
(select centroid.latitude, centroid.longitude from
geo.places where text="north beach, san francisco") and
radius=1 and query="pizza" and location=""
```

In the above example, the inner SELECT returns two data fields (centroid.latitude and centroid.longitude) which are compared with the two input keys (latitude and longitude) of the outer SELECT.

The next example shows an inner SELECT that returns data from an RSS feed:

```
select * from search.web where query in (select title from
rss where url="http://rss.news.yahoo.com/rss/topstories" |
truncate(count=1))
```

In one embodiment, one sub-select is allowed in each SELECT. In other words, each SELECT statement can only have one IN keyword, but the inner SELECT may also have an IN keyword. The following statement is acceptable:

```
select * from search.siteexplorer.pages where query in
(select url from search.web where query in (select
Artist.name from music.release.popular limit 1) limit 1)
```

However, the following statement is not acceptable because it has two IN keywords in a SELECT:

```
select * from flickr.photos.search where lat in (select
centroid.latitude from geo.places where text="sfo") and lon
in (select centroid.longitude from geo.places where
text="sfo")
```

Many QL Web Service queries access back-end web data sources that contain thousands, or even millions, of items. When querying large web data sources, applications may need to page through the results data to improve performance and usability. The QL Web Service enables applications to implement paging or to limit output data table size at either a remote level or at a local level. To find out how many items (output data rows) a query (SELECT) returns in XML formatted output data results, the value of the yahoo:count attribute of the query element can be checked in the output data results. Similarly, to find out how many items (output data rows) a query (SELECT) returns in JSON formatted output data results, the value of the count object can be checked in the output data results. In one embodiment, the maximum number of items returned by a SELECT is 5000. Also, in one embodiment, the maximum processing time for a QL statement is 30 seconds. Also, in one embodiment, for most QL tables, the default number of items returned is 10, if a limit is not specified in the SELECT statement. It should be understood, however, that in other embodiments the maximum number of items returned by a SELECT statement, the maximum processing time for a QL statement, and the default number of items returned can be set at values different than those stated for the example embodiments above.

A remote limit controls the number of items (rows) that the QL Web Service retrieves from the back-end web data source. To specify a remote limit, an offset (start position) and a number of items is specified in parentheses after the table name. The default offset is 0. For example, in the following QL statement, the offset is 0 and the number of items is 10:
select title from search.web(0,10) where query="pizza"

When QL statement above runs, QL calls Yahoo! Search BOSS (the back-end web data source for the search.web QL table) and gets the first 10 items that match the query="pizza" filter.

The following example QL statement gets items 10 through 30, i.e., starting at position 10, it gets 20 items:
select title from search.web(10,30) where query="pizza"

If only one number (n) is provided in the remote limit controls, the offset is considered to be 0, and the number of items is considered to be (n). Therefore, the remote limit control of (n) is the same as the remote limit control of (0,n). For example, the following QL statement gets the first 20 items because the default offset is 0:
select title from search.web(20) where query="pizza"

The default number of items for a remote limit varies with the QL table. For most QL tables, the default number of items is 10. The maximum number of items also varies with the QL table. To get the maximum number of items, enter 0 in parentheses after the table name. For example, the following QL statement returns 1000 items from the back-end web data source associated with the search.web QL table:

select title from search.web(0) where query="pizza"

A local limit controls the number of output data rows the QL Web Service returns to the calling application. The QL Web Service applies a local limit to the data set that it has already retrieved from the back-end web data source. To specify a local limit, the LIMIT and OFFSET keywords (each followed by an integer) can be included after the WHERE clause. The integer value following the LIMIT keyword specifies the number of rows. The integer value following the OFFSET keyword indicates the starting position. The OFFSET keyword is optional. The default offset is 0, which is the first row.

The following example QL statement has a remote limit of 100 and a local limit of 15:

```
select title from search.web(100) where query="pizza" limit
   15 offset 0
```

When the above QL statement runs, the QL Web Service gets up to 100 items from the back-end web data source. On these items, the QL Web Service applies the local limit and offset. So, the above QL statement returns 15 output data rows to the calling application, starting with the first row (offset 0).

The QL Web Service retrieves items from the back-end web data source one page at a time until either the local or remote limit has been reached. The page size to be applied to the back-end web data source is specified in the associated QL table and can vary between QL tables. The following example QL statement has an unbounded remote limit (0), so the QL Web Service retrieves items from the back-end web data source until the local limit of 65 is reached:

select title from search.web(0) where query="pizza" limit 65

The QL Web Service includes built-in functions such as sort, which are appended to the SELECT statement with the pipe symbol ("|"). These functions are applied to the result data set after all other operations specified in the SELECT statement have been performed, such as applying filters and limits. The following is an example QL statement that includes an appended function:

```
select * from social.profile where guid in (select guid from
   social.connections where owner_guid=me) |
   sort(field="nickname")
```

In the above QL statement, the sub-select returns a list of GUIDs, and the outer select returns a set of profiles, one for each GUID. This set of profiles is piped to the sort function, which orders the results according to the value of the nickname field.

Multiple functions can be chained together with the pipe symbol ("|"). The following QL statement queries the local.search table for restaurants serving pizza. The results are piped to the sort function, then to the reverse function. The final result contains up to 20 rows, sorted by rating from high to low:

```
select Title, Rating.AverageRating from local.search(20)
   where query="pizza" and city="New York" and state="NY" |
   sort(field="Rating.AverageRating") | reverse( )
```

FIG. 4 shows a table of possible QL functions that can be appended to a QL SELECT statement, in accordance with one embodiment of the present invention. Function arguments are specified in FIG. 4 as name-value pairs. It should be understood that the QL Web Service is not limited to the QL functions shown in FIG. 4. Other embodiments of the QL Web Service may include additional QL functions that are not shown in FIG. 4.

When QL runs a SELECT statement, it accesses a back-end web data source, typically by calling a web service. Remote filters and limits are implemented by the back-end web service. Local processing, including local filters and limits, is performed by the QL Web Service on the data it fetches from the back-end web data source. It should be appreciated that whether an operation is remote or local affects the data returned to the application that calls the SELECT statement. FIG. 5 shows a table which identifies whether an element in a QL SELECT statement is processed locally or remotely, in accordance with one embodiment of the present invention.

In one embodiment, the QL Web Service includes a set of pre-defined, i.e., built-in, QL tables that call the Yahoo! Social APIs. The social.profile table, for example, contains information about a Yahoo! user, and the social.connections table is a list of the user's friends. The Global User Identifier (GUID) is a string that uniquely identifies a Yahoo! user. In this embodiment of the QL Web Service, the me keyword is the GUID value of the user currently logged in to Yahoo!. For example, if a given person is logged in to Yahoo!, and that given person runs the following statement, the QL Web Service will return the given person's profile information:

select*from social.profile where guid=me

Because me is a keyword, it is not enclosed in quotes. To specify a GUID value, the GUID value can be expressed as a string enclosed in quotes, such as in the following example:

```
select * from social.updates where
   guid='7WQ7JILMQKTSTTURDDAF3NT35A'
```

If a URL for a call to the QL Web Service contains @var literals, the QL Web Service replaces the literals with the values of query parameters with the same names. For example, suppose that the URL for the call to the QL Web Service has the animal query parameter:

```
http://query.yahooapis.com/v1/yql?animal=dog&q=select * from
   sometable where animal=@animal
```

For the above example URL, the QL Web Service will run the following SELECT statement:

select*from sometable where animal="dog"

The QL Web Service includes the ability to access data at back-end web data sources that are formatted as structured data feeds such as RSS and ATOM. However, if no such feed is available, it is possible to specify the source as HTML and use XPath to extract the relevant portions of the HTML page. For example, to get information from Yahoo! Finance about Yahoo! Inc. stock (YHOO), the following QL statement may be initially used:

```
select * from html where
    url="http://finance.yahoo.com/q?s=yhoo"
```

Because the above QL statement returns all of the page's HTML, it would not be very useful in an application. By adding an XPath expression to the above QL statement, it is possible retrieve specific portions of the HTML page. The XPath expression in the following statement traverses through the nodes in the HTML page to isolate the latest headlines:

```
select * from html where
    url="http://finance.yahoo.com/q?s=yhoo" and
    xpath='//div[@id="yfi_headlines"]/div[2]/ul/li/a'
```

In the above example, the XPath expression looks first for a div tag with the ID yfi_headlines. Next, the expression gets the second div tag and looks for an anchor tag (a) within a list item (li) of an unordered list (ul). The following QL statement also gets information about Yahoo! Inc. stock, but traverses the nodes to get key statistics:

```
select * from html where
    url="http://finance.yahoo.com/q?s=yhoo" and
    xpath='//div[@id="yfi_key_stats"]/div[2]/table'
```

Instead of the wildcard asterisk (*) as shown above, it is possible to specify a particular element for the XPath to process. For example, the following statement extracts only the HTML links (href tags) within the headlines on Yahoo! Finance:

```
select href from html where
    url="http://finance.yahoo.com/q?s=yhoo" and
    xpath='//div[@id="yfi_headlines"]/div[2]/ul/li/a'
```

To get just the content from an HTML page, it is possible to specify the content keyword after the word select. A QL statement with the content keyword processes the HTML in the following order:
1. The QL statement looks for any element named "content" within the elements found by the XPath expression.
2. If an element named "content" is not found, the QL statement looks for an attribute named "content".
3. If neither an element nor attribute named "content" is found, the QL statement returns the element's textContent.

The following QL statement, for example, returns the textContent of each anchor (a) tag retrieved by the XPath expression:

```
select content from html where
    url="http://finance.yahoo.com/q?s=yhoo" and
    xpath='//div[@id="yfi_headlines"]/div[2]/ul/li/a'
```

QL Statement Output Data

In one embodiment, the QL Web Service can return, i.e., output, data in either XML, JSON, or JSONP format. However, it should be understood that in other embodiments the QL Web Service can be extended to return data in essentially any format. In one embodiment, the default format is XML. In this embodiment, to get output data in JSON format, include the format=json parameter in the URL of the QL Web service. For example:

```
http://query.yahooapis.com/v1/public/yql?q=select * from
    social.connections where owner_guid=me&format=json
```

To specify JSONP as the output data format, include both the format and callback query parameters in the URL of the QL Web service. The callback parameter indicates the name of the JavaScript callback function. For example:

```
http://query.yahooapis.com/v1/public/yql?q=select * from
    social.connections where
    owner_guid=me&format=json&callback=cbfunc
```

It should be understood that the format of the output data conveyed by the QL Web Service is not dependent on the data format at the back-end web data source. For example, if a back-end web data source expresses its data in XML format, the QL Web Service is not restricted to conveying the data acquired therefrom in XML format. For example, in this case the QL Web Service can return output data in JSON format or any other format.

In one embodiment, the QL Web Service also provides for returning output data as a JSON envelope having XML content. More specifically, if the QL statement specifies a callback (callback=cbfunction) and also requests the format to be in XML (format=xml), then the QL Web Service returns a string representation of the XML within an array. This type of output data format is referred to as JSONP-X.

In one embodiment, each response from the QL Web Service includes a query element, which contains diagnostics and results elements. Repeating elements within results element correspond to "rows" from a QL table. For example, the following QL statement returns multiple connection elements within the results element:
select*from social.connections FIG. 6 shows the basic structure of the XML formatted output data in the response generated by a call to the QL Web Service, in accordance with one embodiment of the present invention. FIG. 7 shows the basic structure of the JSON formatted output data in the response generated by a call to the QL Web Service, in accordance with one embodiment of the present invention.

The attributes of the query element and the sub-elements of the diagnostics element in the output data generated by execution of a given QL statement can be examined to get information about the execution of the given QL statement. FIG. 8 shows a table that lists the attributes of the query element in the XML formatted output data returned by the QL Web Service, in accordance with one embodiment of the present invention. In the JSON formatted response data, the attributes listed in FIG. 8 are mapped to the name-value pairs contained in the query object.

The diagnostics element in the output data includes information about the calls the QL Web Service made to the back-end web data sources. FIG. 9 shows a table that lists the XML formatted sub-elements of the diagnostics element, in accordance with one embodiment of the present invention. In the JSON formatted output data, the sub-elements listed in FIG. 9 are mapped to name-value pairs contained in the diagnostics object.

If the QL Web Service output data is returned in JSON format, and the back-end web data source is defined in an XML format, then the QL Web Service transforms the data from XML format to JSON format. In one embodiment, the QL Web Service transforms XML formatted data to JSON formatted data according to the following rules:

Attributes are mapped to name:value pairs.

Element CDATA or text sections are mapped to "content": value pairs if the element contains attributes or sub-elements. Otherwise, they are mapped to the element name's value directly.

Namespace prefixes are removed from names.

If the attribute, element, or namespace-less element would result in the same key name in the JSON structure, an array is created instead.

FIG. 10 shows an example listing of XML formatted output data and corresponding JSON formatted output data, where the JSON formatted output data has been transformed from the XML formatted data according to the rules listed above, in accordance with one embodiment of the present invention. It should be understood that transformation from XML format to JSON format can be "lossy," in that the data may not be transformable back into the XML format from the JSON format.

In one embodiment, the QL Web Service is defined to return the following HTTP response codes:

200 OK: The QL statement executed successfully. If the QL statement is syntactically correct and if authorization succeeds, it returns 200 OK even if the calls to back-end data services fail, i.e., return other error codes.

400 Bad Request: Malformed syntax or bad query in QL statement. This error occurs if the WHERE clause does not include a required input key. In the returned results data, the XML error element includes a text description of the error.

401 Authorization Required: The user running the application calling the QL Web Service is not authorized to access the private data indicated in the QL statement.

QL Tables

The QL Web Service includes an extensive list of built-in QL tables for use that cover a wide range of Yahoo! Web services and access to off-network data. A listing of the built-in QL tables can be obtained by running the QL statement SHOW TABLES. A description of any QL table can be obtained by running the QL statement DESC table, where table is the name or URL of the QL table to be described.

Additionally, the QL Web Service provides for creation and use of QL Open Data Tables, thereby enabling the QL Web Service to bind with any web data source through the QL language. A QL Open Data Table definition is an independently defined structured file, e.g., XML file, that contains at least the following information to enable binding of the associated web data source with the QL Web Service:

Authentication and Security Options: Specifies the kind of authentication required for incoming requests from the QL Web Service. Specifies whether or not incoming connections from the QL Web Service are required to be made over a secure socket layer (via HTTPS).

Sample Query: A sample query that developers can run via the QL Web Service to get information back from the web data source connection.

QL Data Structure: Instructions on how the QL Web Service should create URLs that access the data available from the web data source connection. A QL Open Data Table definition provides the QL Web Service with the URL location of the web data source, along with the individual query parameters (keys) available to the QL Web Service.

Pagination Options: Specifies how the QL Web Service should "page" through results. If the web data source can provide staggered results, paging will allow the QL Web Service to limit the amount of data returned.

The QL Web Service provides the QL USE statement to access external data via QL Open Data Tables. A single QL Open Data Table can be accessed as indicated in the following example QL USE statement:

```
USE "http://myserver.com/mytables.xml" AS mytable;
SELECT * FROM mytable WHERE...
```

In the above QL statement, USE precedes the location of the QL Open Data Table definition, which is then followed by AS and the table name to be associated with the specified QL Open Data Table definition. After the semicolon, the QL statement is formed as discussed above with regard to the QL SELECT statement. In the above example, the QL Web Service fetches the URL indicated by the USE statement and makes it available as a table named mytable in the current request scope. The statements following use can then select or describe the particular table using the name mytable.

Multiple QL Open Data Tables can be invoked by using multiple USE statements, as shown in the following example:

```
USE "http://myserver.com/mytables1.xml" as table1;
USE "http://myserver.com/mytables2.xml" as table2;
SELECT * FROM table1 WHERE id IN (select id FROM table2)
```

Additionally, a QL environment file can be defined to specify use of multiple QL Open Data Tables. The QL environment file provides for use of multiple tables at once without having to specify the USE verb in the QL statements. The QL environment file is a text file that contains a list of USE and SET statements, typically ending with a ".env" suffix. An example QL environment file may appear as follows:

```
USE 'http://www.datatables.org/amazon/amazon.ecs.xml' AS amazon.ecs;
USE 'http://www.datatables.org/bitly/bit.ly.shorten.xml' AS bit.ly.shorten;
USE http://www.datatables.org/delicious/delicious.feeds.popular.xml' AS delicious.feeds.popular;
USE 'http://www.datatables.org/delicious/delicious.feeds.xml' AS delicious.feeds;
USE 'http://www.datatables.org/dopplr/dopplr.auth.xml' AS dopplr.auth;
USE 'http://www.datatables.org/dopplr/dopplr.city.info.xml' AS dopplr.city.info;
USE http://www.datatables.org/dopplr/dopplr.futuretrips.info.xml ' AS dopplr.futuretrips.info;
USE http://www.datatables.org/dopplr/dopplr.traveller.fellows.xml' AS dopplr.traveller.fellows;
```

Once the QL environment file is uploaded to the developer's server, the developer can simply access the QL Web Service and append the location of the file as follows:

```
http://developer.yahoo.com/yql/console/?env=http://datatable
s.org/alltables.env
```

Also, multiple QL environment files can be utilized at once by using multiple "env" query parameters. The multiple QL environment files are loaded in the order they appear in the query string. For example:

```
http://developer.yahoo.com/yql/console/?env=http://datatable
s.org/alltables.env&env=http://website.com/mytable.env
```

The QL Web Service provides for the set up of key values for use within QL Open Data Tables. For example, it is possible to set values, such as passwords, API keys, and other required values, independently of QL statements and API calls. The following example sets the api_key value within the QL statement itself:

```
select * from guardian.content.search where
api_key="1234567890" and q='environment'
```

The SET keyword allows you to set key values outside of a QL statement, including within QL environment files. The SET keyword uses the following syntax within a QL environment file:
SET api_key="1234567890" ON guardian;
In the example above, SET is followed by the key (api_key) and its value (1234567890), and the prefix (guardian) of the table is specified. Once a key value is set within an environment file, the key value is removed from the QL statement, as follows:

```
select * from guardian.content.search where
query="environment"
```

In one embodiment, the following precedence rules apply when setting key values with the SET keyword:
 Keys that are set within the QL statement take precedence over keys that are set using the SET keyword.
 If the set key is multiply defined, the most precise definition, based on the length of the table prefix, takes precedence.
 If the set key is multiply defined at the same preciseness, the last definition is used.

The SET keyword can be used to hide key values or data. More specifically, to avoid exposing private data when sharing QL Open Data Tables, a combination of QL features can be used to hide such data, as follows:
 1. Add private values to an environment file using the SET keyword.
 2. Use the yql.storage.admin table to import the environment file or QL Open Data Table with a memorable name. The QL Web Service provides a set of shared access keys.
 3. Use the shared execute or select access keys in lieu of either a QL Open Data Table, environment file, or JavaScript.

The QL Web Service is defined to support a structured arrangement of elements and sub-elements within a QL Open Data Table. In one embodiment, the available QL Open Data Table elements and sub-elements include the following, which are described in detail below:
 table (The root element of the QL Open Data Table.)
 table/meta
 table/bindings/select
 table/bindings/insert
 table/bindings/update
 table/bindings/delete
 table/bindings/select/urls/urls
 table/bindings/select/execute
 table/bindings/[select/insert/update/delete]/inputs/key
 table/bindings/[select/insert/update]/inputs/value
 table/bindings/[select/insert/update/delete]/inputs/map
 table/bindings/select/paging
 table/bindings/select/paging/pagesize
 table/bindings/select/paging/start
 table/bindings/select/paging/total
 table/bindings/select/paging/nextpage.

The table element is the root element for the document. A table is the level at which an end-user can "select" information from QL web data sources. A table can have many different bindings or ways of retrieving the data. In one embodiment, a single table provides a single type of data. The following is an example specification of the table element:

```
<table
    xmlns="http://query.yahooapis.com/v1/schema/table.xsd">
```

In the above example, xmlns is an attribute of the table element. FIG. 11A shows a listing of attributes available for specification in association with the table element, in accordance with one embodiment of the present invention. It should be understood that in other embodiments, the table element may have more or less available attributes than those specifically shown in FIG. 11A.

The securityLevel attribute of the table element, as listed in FIG. 11A, determines the type of authentication required to establish a connection. In order for a user to connect to the QL Open Data Table, the user must be authorized at the level or higher than the level indicated in the securityLevel attribute. FIG. 11B shows a table that lists whether access is available depending on the value in the securityLevel attribute.

In addition to the table element, the QL Open Data Table is required to include the meta sub-element. The following is an example specification of the meta sub-element:

```
<meta>
    <author>Yahoo! Inc.</author>
    <documentationURL>http://www.flickr.com/services/a
pi/flickr.photos.search.html</documentationURL>
    <sampleQuery>select * from {table} where
has_geo="true" and text="san francisco"</sampleQuery>
</meta>
```

In the above example, author, documentationURL, and sampleQuery are attributes of the meta sub-element. FIG. 12 shows a listing of attributes available for specification in association with the meta sub-element, in accordance with one embodiment of the present invention. It should be understood that in other embodiments, the meta sub-element may have more or less available attributes than those specifically shown in FIG. 12.

Situated within each bindings element, is one of four keywords: select, insert, update, or delete. The select element describes the information needed for the QL Web Service to read data from an API. The insert and update elements describe the information needed to add or modify data from an API, respectively. When removing data, the delete element is used to describe the necessary bindings.

When a keyword such as select or update is repeated within the bindings array, it can be considered to be an alternative way for the QL Web Service to call a remote server to get the same type of structured data. Typically, this is used when the service supports different sets of query parameters (QL's "keys") or combinations of optional query parameters.

Unlike XML, JSON objects have no "root" node. To work with the dot notation, the QL Web Service creates a "pseudo" root node for JSON responses called "json". If it is necessary to return a sub-structure from a QL Open Data Table that fetches or produces JSON, "json" should be added at the root of the path.

The following is an example specification of the bindings/select element:

```
<bindings>
    <select itemPath="rsp.photos.photo"
produces ="XML">
    ...
</bindings>
```

In the above example, itemPath is an attribute of the bindings/select element. FIG. 13 shows a listing of attributes available for specification in association with the bindings/select element, in accordance with one embodiment of the present invention. It should be understood that in other embodiments, the bindings/select element may have more or less available attributes than those specifically shown in FIG. 13.

The table/bindings/select/urls/urls element (referred to as the "urls" element) is where the QL Web Service and the QL Open Data Table supporting the back-end web data source come together. The url element describes the LTRL that needs to be executed to get data for the particular QL Open Data Table, given the keys in the key elements. While generally there is only one URL specified, if a particular web data service supports a "test" select and it is desirable to expose it, an additional urls element can be added for that environment.

The CDATA/TEXT for the urls element contains the URL itself that utilizes substitution of values at runtime based on the uri template spec. The names of the values will be substituted and formatted according to the uri template spec, but one method is to enclose a key name within curly braces ({ }). All {name} keys found in the URL will be replaced by the same id key value in the keys elements. The QL Web Service currently supports both http and https protocols. An example of this is shown as follows:

```
https://prod.gnipcentral.com/publishers/{publisher}/notification/{bucket}.xml
```

In the above example, the QL Web Service will look for key elements with the names publisher and bucket. If the QL statement developer does not provide those keys in the WHERE clause (and they are not optional), then the QL Web Service detects the problem and will produce an error. If an optional variable is not provided, but is part of the QL Open Data Table definition, it will be replaced with an empty string. Otherwise, the QL Web Service will substitute the values directly into the URL before executing it.

The table/bindings/select/execute element (referred to as the "execute" element) allows for invocation of server-side JavaScript in place of a GET request. An example of the execute element is shown as follows:

```
<execute>
    <![CDATA[
    // Include the flickr signing library
    y.include("http://blog.pipes.yahoo.net/wp-content/uploads/flickr.js");
    // GET the flickr result using a signed url
    var fs = new flickrSigner(api_key,secret);
    response.object =
y.rest(fs.createUrl({method:method,format:""})).get( ).response( );
    ]]>
</execute>
```

By way of the execute element, it is possible to embed JavaScript and E4X (the shortened term for EcmaScript for XML), which adds native XML support to JavaScript. When a QL statement calls a QL Open Data Table having a definition that includes the execute element, the QL Web Service does not perform the request to the templated URI in the endpoint. Rather, the QL Web Service provides a runtime environment in which the JavaScript is executed server-side. The JavaScript in turn is required to return data as the output to the original QL statement.

The ability to execute JavaScript via the execute element extends the functionality of QL Open Data Tables in many ways, including the following:

Flexibility beyond the normal templating within QL Open Data Tables: Executing JavaScript allows you to use conditional logic and to format data in a granular manner.

Data shaping and parsing: Using JavaScript, you can take requests and responses and format or shape them in way that is suitable to be returned.

Support for calling external Web services: Some Web services use their own security and authentication mechanisms. Some also require authentication headers to be set in the Web service request. The execute element allows you to do both.

Support for adding, modifying, and deleting data using external Web services: For Web services that support write access, the QL Web Service allows you to insert, update, and delete using server-side JavaScript within the insert, update, and delete elements, which are nested within the binding element.

Each of the following elements is referred to as an "inputs" element:

```
table/bindings/[select/insert/update/delete]/inputs/key
table/bindings/[select/insert/update]/inputs/value
table/bindings/[select/insert/update/delete]/inputs/map
```

In one embodiment, there are three types of elements available within the inputs element: key, value, and map. Each key element represents a named "key" that can be provided in the WHERE or INTO clause of QL SELECT, INSERT, UPDATE, or DELETE statements. The QL Web Service inserts these values into the URL request before it is sent to the server. The QL Web Service inserts these values into the URL request if the paramType is set to query or path or header. For a variable type, the key named as the id of the element is made available in the execute section of the QL Open Data Table.

The value element can be used to assign a new "value" or update an existing value within a QL Open Data Table. The value element defines a field that can only be set as an input and therefore cannot be in QL statements to satisfy the WHERE clause. The value element only works with the INSERT and UPDATE verbs and in different ways.

When used with the insert keyword, the value element appears in the VALUE expression of the QL statement, indicating that a new value is being passed into the QL statement, as seen in the following example:

```
INSERT into bitly.shorten (login, apiKey, longUrl) VALUES
('YOUR_LOGIN', 'YOUR_API_KEY', 'http://yahoo.com')
```

When used with the update keyword, the value element is called from the SET portion of the QL statement. This indicates that you are "setting" a particular value, as seen in the following example:

```
UPDATE table SET status='Reading the YQL Guide' where guid =
me;
```

The map element enables use of dynamic keys. With the map element, the QL Web Service uses the value passed in through the QL statement as a variable. This variable is used within the execute portion of the QL Open Data Table to determine what action to take. For example, you may set up a QL Open Data Table that updates either bit.ly, delicio.us, or tinyurl, depending on the value specified in the QL statement. For a dynamic key called type, the actual ID in a QL query would look like the following:

field.type='Java'

In the absence of the map element as a binding, all identifiers, not corresponding to a binding element and that appear in a QL query, are treated as local filters. The map element can be used for each of the paramTypes: query, matrix, header, path, and variable, as described in FIG. 15. The following is an example of the map element being used in a path:

<map id="field" paramType="path"/>

For a query containing the relational expression field.type='rss', only the dynamic parameter name type would be substituted in the urls element. The URI template would look like the following:

http://rss.news.yahoo.com/{type}/topstories

The following is an example specification of the inputs element:

```
<inputs>
    <key id='guid' type='xs:string' paramType='path'
required="true"/>
    <key id='ck' type='xs:string' paramType='variable'
required="true" />
    <key id='cks' type='xs:string'
```

```
paramType='variable' required="true" />
    <value id='content' type='xs:string'
paramType='variable' required="true" />
</inputs>
```

In the above example, key and value are elements under the inputs element. FIG. 14 shows a table indicating which keywords (select, insert, update, delete) support the key, value, and map elements, in accordance with one embodiment of the present invention. FIG. 15 shows a table listing the attributes available within the key, value, and map elements, in accordance with one embodiment of the present invention.

The QL Web Service provides for aliasing within the key, value, and map elements. For instance, if there is an obscurely named id in the QL Open Data Table, an alias can be defined and used to refer to it within QL statements. For example, perhaps an id called "q" is present within the QL Open Data Table, which actually is a search parameter. The term "as" can be used to create an alias in the following way:

```
<key id="q" as=type="xs:string" paramType="query"/>
select * from google.search where search="pizza"
```

The table/bindings/select/paging element (referred to as the "paging" element) describes how the QL Web Service should "page" through the web data source results, if they span multiple pages, or the service supports offset and counts. An example of the paging element is shown as follows:

```
<paging model="page">
    <start id="page" default="0" />
    <pagesize id="per_page" max="250" />
    <total default="10" />
</paging>
<paging model="url">
    <nextpage path="ysearchresponse.nextpage" />
</paging>
```

The paging element includes an attribute model that is used to specify the type of model to use to fetch more than the initial result set from the web data service. The attribute model can be set equal to a literal value of either offset, page, or url. The offset value refers to services that allow arbitrary index offsets into the result set. The page value is used for services that support distinct "pages" or some number of results. The url value is used for services that support a URL to access further data, e.g., to access the next page of data. When the url paging model is used, the pagesize element (discussed below) may be used to adjust the number of results returns at once, if the web data service allows.

The paging element includes the following sub-elements: pagesize, start, total, and nextpage. The pagesize element provides information about how the number of items per request can be specified. The start element provides information about how the "starting" item can be specified in the set of results. The total element provides information about the total number of results available per request by default. The nextpage element provides information about the location of the next page of results. The nextpage element is an optional element used in conjunction with the parent url element. FIG. 16 shows a table listing the attributes available within the pagesize, start, total, and nextpage elements, in accordance with one embodiment of the present invention.

FIG. 17 shows an example QL Open Data Table defined to tie into the Flickr API and allow the QL Web Service to retrieve data from a Flickr photo search, in accordance with one embodiment of the present invention. FIG. 18 shows an example QL Open Data Table defined to the Gnip API to retrieve activities from a Publisher, which in this example is Digg, in accordance with one embodiment of the present invention.

The QL SELECT statement allows for reading of structured data from almost any source on the Web. To perform data manipulation, the QL Web Service provides three other keywords (INSERT, UPDATE, DELETE) for writing, updating, and deleting, respectively, data mapped using a QL Open Data Table. The QL INSERT statement inserts or adds new data to a back-end data source associated with a QL table. The QL UPDATE statement updates or modifies existing data at a back-end data source associated with a QL table. The QL DELETE statement removes data from a back-end data source associated with a QL table. It should be understood that the INSERT, UPDATE, and DELETE operations are performed on back-end data sources and are performed independently from the SELECT operation. The INSERT, UPDATE, DELETE statements require the proper binding inputs, such as key, value, or map. The actual addition, modification, or deletion of data is performed within the QL Open Data Table. Most web sources that provide write capability need authentication. Examples of authentication include username/password combinations or secret API tokens. If the QL table requires input that is deemed "private", such as any passwords, authentication keys, or other "secrets", the https attribute within the tables element should be set to true.

The INSERT, UPDATE, DELETE statements rely entirely on appropriate bindings within a QL Open Data Table to be usable. Specifically, it is necessary to use an insert, update, or delete bindings element. These binding elements help to determine what happens with the information you pass in through a QL statement. For Web services that require specific authentication methods or specific types of HTTP requests, the QL Web Service provides several JavaScript methods for use within the execute element, including:

Methods that allow HTTP PUT, POST, and DELETE requests, in addition to GET.

The ability to specify the content type on data being sent, using contentType.

The ability to automatically convert the data being returned using accept.

The QL INSERT statement has the following syntax:

INSERT INTO (table) (list of comma separated field names)
VALUES (list of comma separated values)

The INSERT INTO keywords marks the start of an INSERT statement. The table is either a QL built-in table or a QL Open Data Table that represents a data source. Following the table name is a list of field names indicating the table columns where the QL Web Service inserts a new row of data. The VALUES clause indicates the data inserted into those columns. String values are enclosed in quotes. In one embodiment of the QL Web Service, statement keywords such as SELECT and WHERE are case-insensitive. Table and field names are case sensitive. In string comparisons, the values are case sensitive. String literals are enclosed in quotes. Either double or single quotes are allowed.

The QL UPDATE statement has the following syntax:
UPDATE (table) SET field=value WHERE filter The UPDATE keyword marks the start of an UPDATE statement. This is followed by the table name. The table is either a QL built-in table or a QL Open Data Table that represents a data source. The SET clause is the part of the statement in which new data is passed to the update binding in the QL Open Data Table. The WHERE clause indicates which data should be updated. In one embodiment, only remote filters can be present in the WHERE clause of an UPDATE statement. The following example shows how the UPDATE statement syntax can look for updates to a user's status on Yahoo! Profiles:

UPDATE social.profile.status SET status="Using YQL UPDATE"
WHERE guid=me

In the above example, status and guid are all bindings within the inputs element, which is nested within an update element. The status is a value element, since this is data that is updating a value using the QL Open Data Table. The guid binding is a key element, as it is a required "key" that determines ownership of this status.

The QL DELETE statement has the following syntax:
DELETE FROM [table] WHERE filter The DELETE keyword marks the start of a DELETE statement. The table is either a QL built-in table or a QL Open Data Table that represents a data source. This is immediately followed by a remote filter that determines what table rows to remove. The following example deletes a particular Twitter tweet, wherein the remote filters are the ID of the tweet followed by the username and password for the owner of the tweet:

DELETE FROM twittertable WHERE tweetid="12345" and
username="twitter_username" and password="twitter_password"

As discussed above, the QL Web Service includes the following features, among many others:

The QL Web Service hides the complexity of Web service APIs by presenting data as simple tables, rows, and columns.

The QL Web Service includes pre-defined, i.e., built-in, tables for popular Yahoo! Web services such as Flickr, Social, MyBlogLog, and Search, among others.

The QL Web Service can access services on the Internet that output data in the following formats: HTML, XML, JSON, RSS, Atom, and microformat, among others.

The QL Web Service is extensible, allowing user's to define QL Open Data Tables to access data sources other than Yahoo! Web Services. This feature enables a user to combine data from multiple Web services and APIs, and expose the combined data as a single QL table.

The QL Web Service provides multiple selectable output formats for the results returned by requests to the QL Web Service, such as XML and JSON formats.

The QL Web Service allows sub-selects, which enables the joining of data from disparate data sources on the Web. The QL Web Service returns the data in a structured document, with elements that resemble rows in a table.

The QL Web Service provides a WHERE clause to enable filtering of the data returned through execution of a QL statement.

The QL Web Service provides for paging through returned results, thereby enabling efficient processing of data from large tables.

The QL Web Service is defined to work out the most efficient way of dispatching multiple network calls at the same time, i.e., in parallel, to collect data together for subsequent conveyance to the caller of the QL Web Service. Therefore, the QL Web Service efficiently parallelizes and dispatches network calls across the multiple back-end web data source systems. This is particularly beneficial with regard to joining of data from multiple web data sources.

The QL table does not need to describe every single permutation of calling the back-end web data source with which it is associated. Also, the QL table does not need to describe data acquired from the back-end data source beyond a simple type specification.

FIG. 19 shows an architectural view of the QL Web Service system, in accordance with one embodiment of the present invention. The QL Web Service system architecture includes a QL statement 1901 generated by a developer, i.e., user of the QL Web Service. The QL statement 1901 is described in detail above. The QL statement 1901 is transmitted via the World Wide Web (Internet) 1905 to the QL Web Service 1903, using an appropriate URL entry point to the QL Web Service 1903. As discussed above, the QL Web Service is a system defined to provide a structured interface via the QL to diverse web data sources/services that are accessible through the Internet 1905. By way of the QL, the QL Web Service operates to abstract the complexities and details associated with varied web data sources/services, such that the developer can use the QL to access and consume data available through the varied web data sources/services without having to know the intricacies associated with accessing and consuming the varied web data sources/services.

The QL Web Service 1903 is defined to process the QL statement 1901 and perform the operations directed by the QL statement 1901, by accessing a URL addressed QL table 1907 via the Internet 1905. As discussed above, the QL table 1907 is a structured file defined to bind a particular web data source/service 1909 to the QL Web Service 1903. By way of the QL table 1907, the QL Web Service 1903 is informed as to how the particular web data source/service 1909 can be accessed and consumed, thereby binding the particular web data source/service 1909 to the QL Web Service 1903.

Figure 20:
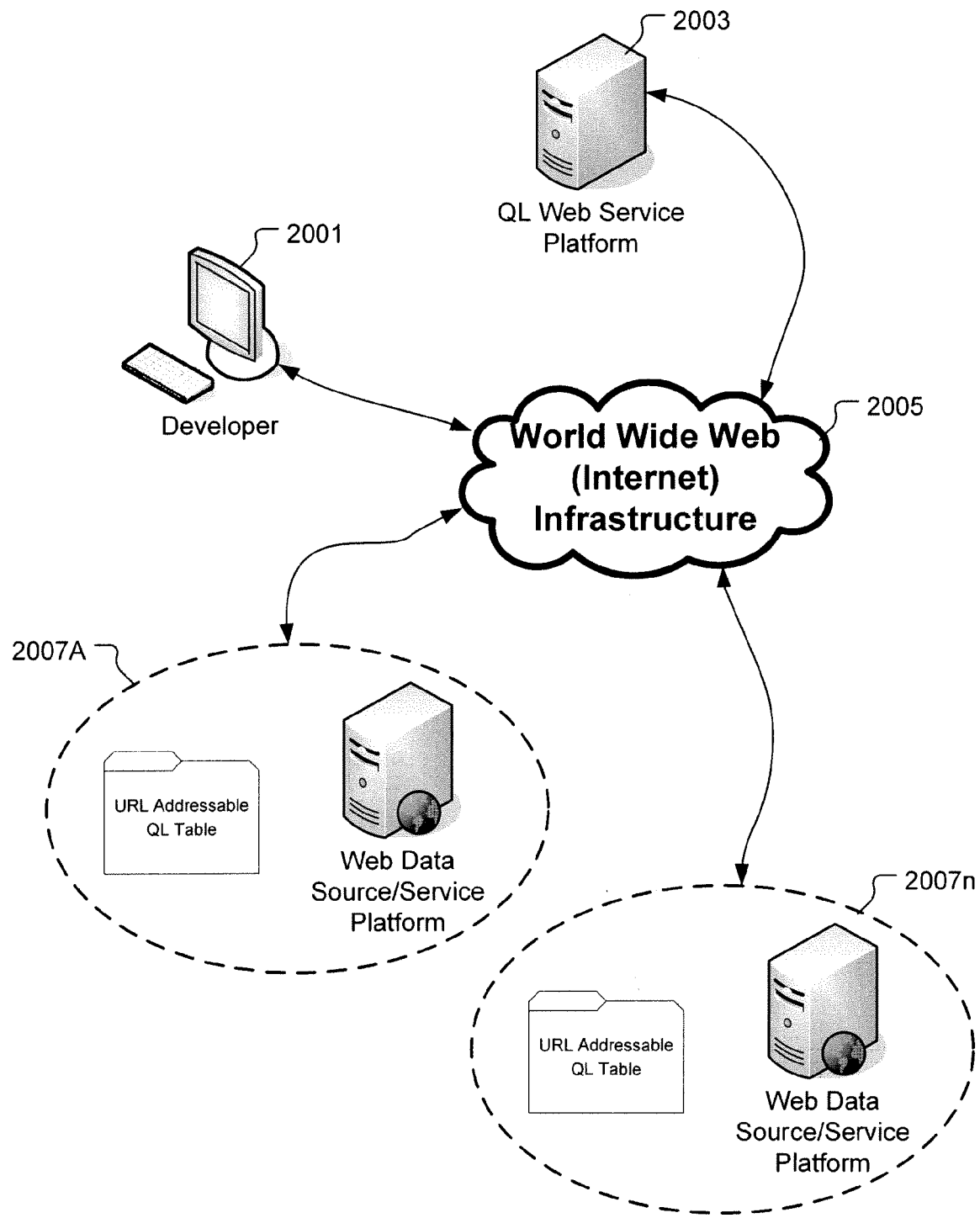
FIG. 20 shows a system level view of the QL Web Service, in accordance with one embodiment of the present invention.

FIG. 20 shows a system level view of the QL Web Service, in accordance with one embodiment of the present invention. Essentially, the system level view of FIG. 20 is a physical representation of the architectural view of the QL Web Service system as described with regard to FIG. 19. The developer creates the QL statement 1901 at a remote terminal 2001. Using a URL to the QL Web Service 1903, the developer's QL statement 1901 is transmitted to the QL Web Service platform 2003 via the Internet 1905. It should be understood that the Internet 1905 is defined by an Internet infrastructure 2005 that includes a network of interconnected computer hardware, e.g., switches, routers, servers, cables, transmitters, receivers, etc., and computer software and firmware, which operate in concert to transmit data from node-to-node throughout the universe of computing systems that are connected to the Internet infrastructure 2005, by either wired or wireless means.

The QL Web Service platform 2003 is defined to execute the QL Web Service 1903. As such, the QL Web Service platform 2003 is defined to connect via the Internet 2005, with any of a number of computing nodes (2007A-2007n) that contains a QL table addressed by a particular URL. Additionally, based on the binding of a web data source/service by the QL table, the QL Web Service platform 2003 is defined to connect via the Internet 2005, with any of a number of computing nodes (2007A-2007n) representing the platform that serves the web data source/service associated with the QL table. Through this connection, the QL Web Service 1903 can access and consume the web data source/service associated with the QL table, as requested by the QL statement received at the QL Web Service platform 2003 from the developer 2001.

A system is disclosed herein for querying web data. The system includes a web data source including data to be queried. The web data source is defined in either an HTML format, an XML format, a JSON format, an RSS format, an Atom format, or microformat, among others. The system also includes a query language (QL) web service defined to expose a QL for specification of the web data source, including data to be queried and one or more operations to be performed on the web data source. Requirements specific to the web data source for accessing and performing operations on the web data source are abstracted through the exposed QL. The QL web service is accessible through a QL web service URL. The QL web service URL is either a public URL enabling access to public web data sources or a private URL enabling access to both public and private web data sources. The system further includes a QL table associated with the web data source. The QL table is accessible through a universal resource locator (URL). The QL table includes binding data which binds the web data source to the QL web service. The binding data includes instructions to the QL web service with regard to creating URLs to access and retrieve data from the web data source.

The QL web service is defined to query data within the web data source, retrieve data from the web data source based on the query, filter the retrieved data, and format the retrieved and filtered data. The QL web service is also defined to transform the retrieved data from a format in which it exists at the web data source into a different specified format. In one embodiment, the QL web service is defined to convey the retrieved data in a tabular arrangement in either an XML format or a JSON format. The XML format specifies XML elements as rows of the tabular arrangement and specifies XML sub-elements or XML attributes as columns of the tabular arrangement. The JSON format specifies JSON objects as rows of the tabular arrangement and specifies JSON name-value pairs as columns of the tabular arrangement. The QL web service is also defined to filter the data retrieved from the web data source according to one or more remote filters, one or more local filters, or a combination thereof. Remote filters are applied to data at the web data source. Local filters are applied to data at the QL web service. Additionally, the QL web service is defined to query data within the web data source in accordance with paging specifications.

It should be appreciated that the system for querying web data can include multiple web data sources each including respective data to be queried, and multiple QL tables respectively associated with the multiple web data sources. The QL web service is defined to use binding data in the multiple QL tables to simultaneously access and retrieve data from the multiple web data sources that are respectively associated with the multiple QL tables, and return the data retrieved from the multiple web data sources in a combined format. The multiple web data sources from which data is retrieved can be defined in accordance with different data formats. The QL web service is defined to join multiple web data sources by providing for use of one or more key identifiers returned in a first set of queried data, resulting from a first query of a first web data source, as input parameters in a second query of a second web data source. In this manner, a second set of queried data resulting from the second query is based on the one or more key identifiers returned in the first set of queried data.

A method is disclosed herein for querying web data. The method includes an operation for generating a query language (QL) statement defined to identify one or more QL tables respectively associated with one or more web data sources, and to specify one or more actions to be performed on the one or more web data sources. The QL statement is formatted in accordance with a QL syntax. The method also includes an operation for embedding the generated QL statement within a universal resource locator (URL) directed to a QL web service. The URL directed to the QL web service is executed within an Internet browser such that the QL statement embedded in the URL is executed by the QL web service.

The method continues with processing the QL statement through the QL web service, whereby the QL web service accesses the one or more QL tables identified in the QL statement through the Internet and retrieves direction from the one or more QL tables regarding access and retrieval of data from the one or more web data sources respectively associated with the one or more QL tables identified in the QL statement. Based on the direction retrieved from the one or more QL tables, the QL web service is operated to access the one or more web data sources respectively associated with the one or more QL tables and perform the one or more actions on the one or more web data source as specified in the QL statement. The method further includes an operation for conveying a result of the one or more actions performed on the one or more web data sources by the QL web service to the Internet browser in which the URL directed to the QL web service was executed. The result can be conveyed as textual data in visual form, such as within a display of a computer system. Also, the result can be conveyed as digital data to be stored and processed by a computer system.

Another method is disclosed herein for binding web data to a web data query system. The method includes an operation for creating a structured file that includes information to bind a web data source to the system for querying web data. In one embodiment, the structured file is defined in an XML format. The information in the structured file includes authentication and security specifications indicating a type of authentication required for the web data query system to access the web data source, and indicating whether or not the web data query system is required to access the web data source over a secure connection. The information in the structured file also includes instructions for how the web data query system should create universal resource locators (URLs) that access data available from the web data source. The method also includes an operation for associating a URL with the structured file to enable access of the structured file through the Internet. The method further includes an operation for storing the structured file on a computer readable storage medium such that the structured file is accessible through the Internet by way of the URL associated with the structured file.

In the above method, the instructions for how the web data query system should create URLs that access data available from the web data source includes a web data source URL and specification of query parameters that are available to access particular data within the web data source. Additionally, the information included within the XML file includes pagination options specifying how the web data query system should traverse through the data available from the web data source. Also, the information included within the XML file further includes a sample query that is executable by the web data query system to demonstrate how data can be retrieved from the web data source.

The QL Web Service provides a graphical user interface (GUI), referred to herein as the QL GUI, that serves as a developer's workbench for creating and testing QL statements for execution through the QL Web Service. The QL GUI provides for entry of QL statements, testing of entered QL statements, viewing/copying of results returned from execution of entered QL statements, and viewing/copying of the QL Web Service URL associated with entered QL statements. Additionally, the QL GUI provides organized and navigatable access to available web data sources by providing a listing of available built-in and open QL tables, along with the ability to view the QL tables and their associated descriptions. Also, the QL GUI provides a convenient listing of recent queries that can be re-instantiated in the QL GUI through a single click on their respective links. And, the QL GUI provides a convenient listing of example queries that can also be instantiated in the QL GUI through a single click, thereby enabling a developer to examine the query syntax, the corresponding QL Web System URL, and returned results data.

Figure 21A:
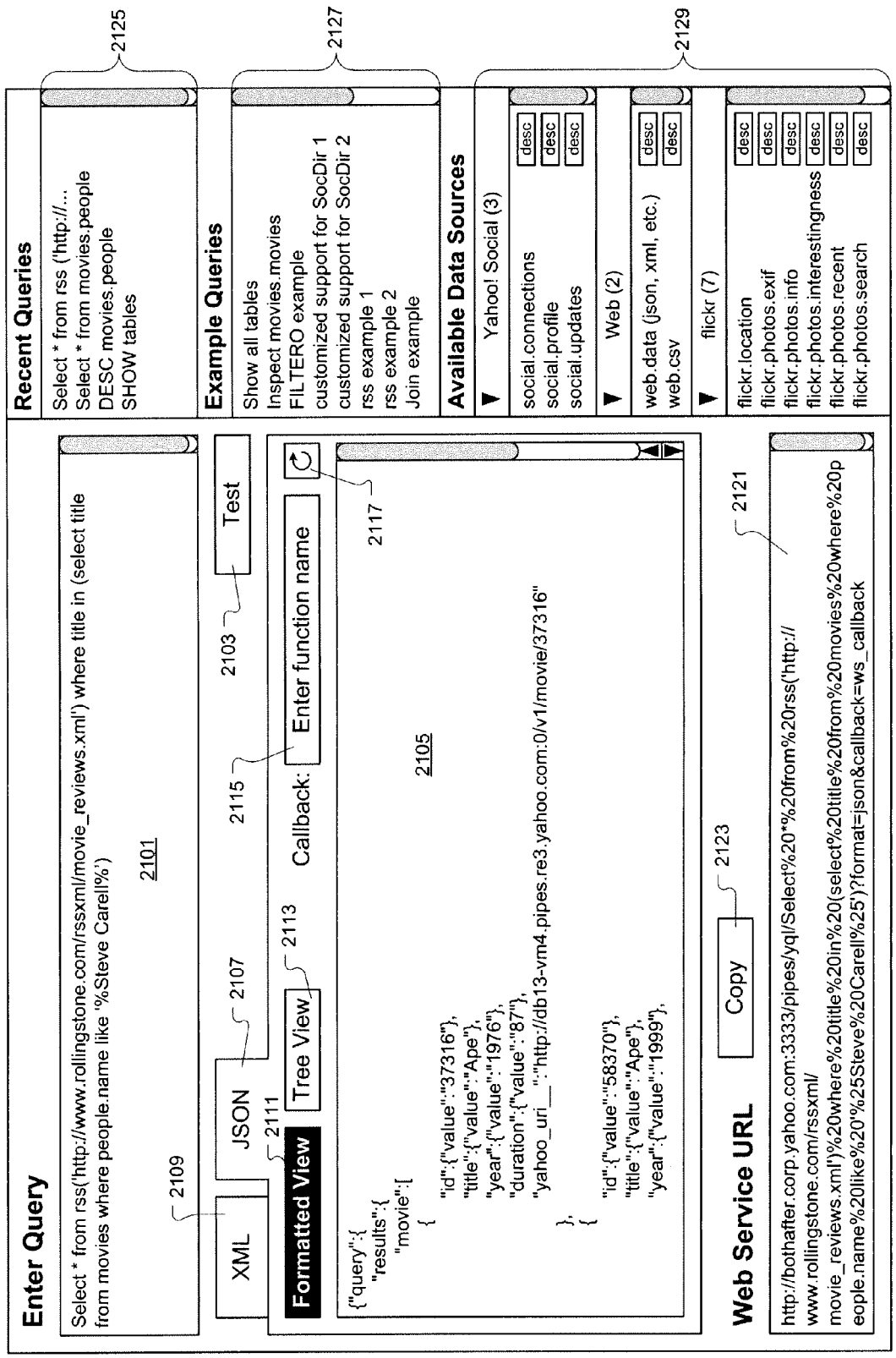
FIG. 21A shows a view of the QL GUI, in accordance with one embodiment of the present invention.

FIG. 21A shows a view of the QL GUI, in accordance with one embodiment of the present invention. It should be appreciated that in different embodiments the various components of the QL GUI, as shown in FIG. 21A and described herein, can be rearranged in essentially any manner within the display region occupied by the QL GUI, and can be visually depicted in essentially any manner so long as the functionality of the various components of the QL GUI is preserved.

Additionally, it should be understood that the various text entry and display windows in the QL GUI can be resized and scrolled. In one embodiment, a given text entry/display window in the QL GUI can be resized by dragging an edge of the given text entry/display window to a new position through use of a pointer icon that is controlled by way of an input device such as a mouse. In one embodiment, text entry/display windows neighboring a given text entry/display window will automatically adjust their position and/or resize to accommodate the resizing of the given text entry/display window. Additionally, each of the text entry/display windows in the QL GUI can be equipped with a scrolling control, such as scroll bar and/or page up/down buttons to enable navigation through textual content that is larger than the current size of the text entry/display window.

As shown in FIG. 21A, the QL GUI includes a query entry window 2101 in which QL statements can be entered manually or displayed from a stored query upon its selection. The QL statement syntax and content as described herein can be entered in the query entry window 2101. An execution control 2103 (labeled "Test") is provided to prompt execution of the QL statement present in the query entry window 2101. Upon activation of the execution control 2103, the QL Web Service operates to execute the QL statement present in the query entry window 2101.

The QL GUI also includes a results display window 2105 in which the data results generated by execution of the QL statement present in the query entry window 2101 are displayed. In one embodiment, the QL GUI is defined to display data results in either XML format or JSON format. The QL GUI provides an XML selection control 2109, which upon activation will cause the returned data results to be displayed in the results display window 2105 in XML format. The QL GUI provides a JSON selection control 2107, which upon activation will cause the returned data results to be displayed in the results display window 2105 in JSON format.

In one embodiment, when the JSON selection control 2107 is activated, the JSON formatted data results can be displayed in either a formatted view or a tree view. When the JSON control 2107 is activated, the QL GUI displays a formatted view control 2111 and a tree view control 2113, which upon activation cause the JSON formatted results to be displayed in the result display window 2105 in the formatted view and tree view, respectively. Also, when the JSON control 2107 is activated, the QL GUI displays a callback entry window 2115 and corresponding callback wrapping control 2117. A callback function name can be entered in the callback entry window 2115. Upon activation of the callback wrapping control 2117, the JSON formatted results data is wrapped in a function format, wherein a name of the function is specified as the callback name entered in the callback entry window 2115. If the callback wrapping control 2117 is activated with the callback entry window 2115 empty, the JSON formatted results data will be displayed without a function wrapper.

The QL GUI further includes a URL display window 2121 in which a URL is displayed that will execute the QL statement present in the query entry window 2101 through the QL Web Service. The QL Web Service is defined to generate the URL displayed in the URL display window 2121. The QL GUI also includes a URL copy control 2123, which upon activation will cause the URL currently displayed in the URL display window 2121 to be saved to a copy buffer. Thus, once a developer is satisfied with the results displayed in the result display window 2105, as generated by execution of a QL statement present in the query entry window 2101, the developer can activate the URL copy control 2123 to copy the correspond QL Web System URL, and subsequently paste the corresponding QL Web System URL in the developer's application.

In one embodiment, the QL GUI includes a side bar display including a recent queries window 2125, an example queries window 2127, and an available data sources window 2129. The recent queries window 2125 displays a listing of recent queries. Upon activation, i.e., click on, of a recent query present in the recent queries window 2125, the activated recent query is re-instantiated within the query entry window 2101. In one embodiment, each query that is entered in the query entry window 2101 and is executed by way of the execution control 2103, is displayed in the recent queries window 2125. In one embodiment, the most recently executed query is added to the top of the listing of recent queries in the recent query window 2125.

The example queries window 2127 displays a listing of example queries that demonstrate the utility of the QL Web Service and QL GUI. Upon activation, i.e., click on, of an example query present in the example queries window 2127, the activated example query is instantiated within the query entry window 2101. Then, upon activation of the execution control 2103, the example query is run with the resulting data displayed in the results display window 2105, and the corresponding QL Web Service URL displayed in the URL display window 2121.

The available data sources window 2129 displays a listing of QL tables, both built-in and QL Open Data Tables, that are currently known to the QL Web Service. The available data sources are displayed by category, e.g., "Yahoo! Social," "Web," "flickr," etc., with QL tables within each category being separately scrollable. Also, each category is collapsible through activation of a control, such as the down arrow shown in the category headings of FIG. 21A. Also, a number of QL tables present in each category can be displayed in parentheses in the category heading. Each QL table listed in the available data sources window 2129 has a corresponding description control "desc" displayed. Activation of a given description control will cause execution of a QL statement "DESC %TableName%" wherein TableName is the name of the QL table corresponding to the activated description control, and wherein execution of the DESC statement causes a description of the QL table to be returned as the results data.

In one embodiment, the QL GUI provides a permalink control, e.g., permalink button. The permalink control enables a developer to get a URL link (permalink URL) that can be shared with other developers and that contains the "query" being tested. The permalink URL can be transmitted by email, instant messenger, or essentially any other Internet communication means. When the recipient of the permalink URL clicks on the permalink URL, the recipient's QL GUI is loaded with the same query that is present in the permalink URL. In one embodiment, the query loaded from the permalink URL auto-runs upon loading into the QL GUI. In another embodiment, the recipient of the permalink URL must activate the execution control 2103 to execute the query that has been loaded into the QL GUI from the permalink URL.

Figure 21B:
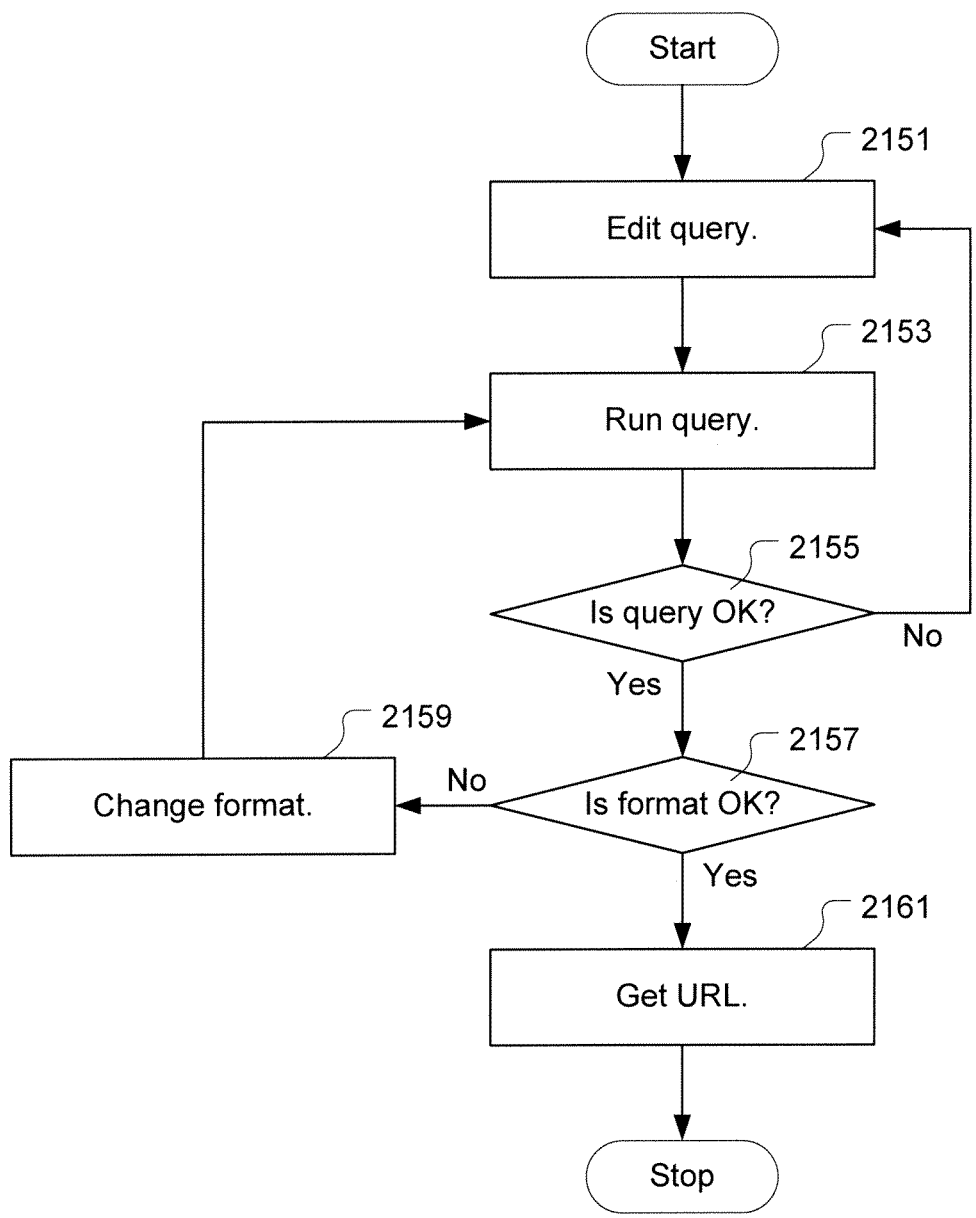
FIG. 21B shows a flowchart of a method for operating the QL GUI of FIG. 21A, in accordance with one embodiment of the present invention.

FIG. 21B shows a flowchart of a method for operating the QL GUI of FIG. 21A, in accordance with one embodiment of the present invention. The method includes an operation 2151 in which a QL statement, i.e., query, is entered in the query entry window 2101. In an operation 2153, the QL statement present in the query entry window 2101 is executed by the QL Web Service. Operation 2153 can be initiated through activation of the execution control 2103. The method proceeds with a decision operation 2155 to determine whether or not the executed query is acceptable. A query can be found to be in error by having incorrect syntax or by referencing parameters or key words that are not allowed or present in a specified QL table. If the query is found to be in error, the method reverts back to operation 2151, whereby the query can be edited to correct the error. Also, in one embodiment, if an error is found in a query, the error is identified and described within the QL GUI.

If the query is found to be acceptable in the decision operation 2155, the method proceeds with a decision operation 2157 to determine whether a specified results data format is acceptable. If the decision operation 2155 finds that the developer desires use of an alternate results data format, the method proceeds with an operation 2159 in which the developer selects the alternate results data format. From the operation 2159, the method reverts back to operation 2153 to re-execute the query using the newly selected results data format. If the decision operation 2155 finds that the developer is satisfied with the currently selected results data format, the method proceeds with an operation 2161 in which developer gets, i.e., copies, the resulting QL Web Service URL for use in the developer's application. For instance, operation 2161 can be performed by the developer by activating the copy control 2123 to copy to the resulting QL Web Service URL displayed in the URL display window 2121 to a buffer for subsequent pasting into the developer's application.

Figure 22:
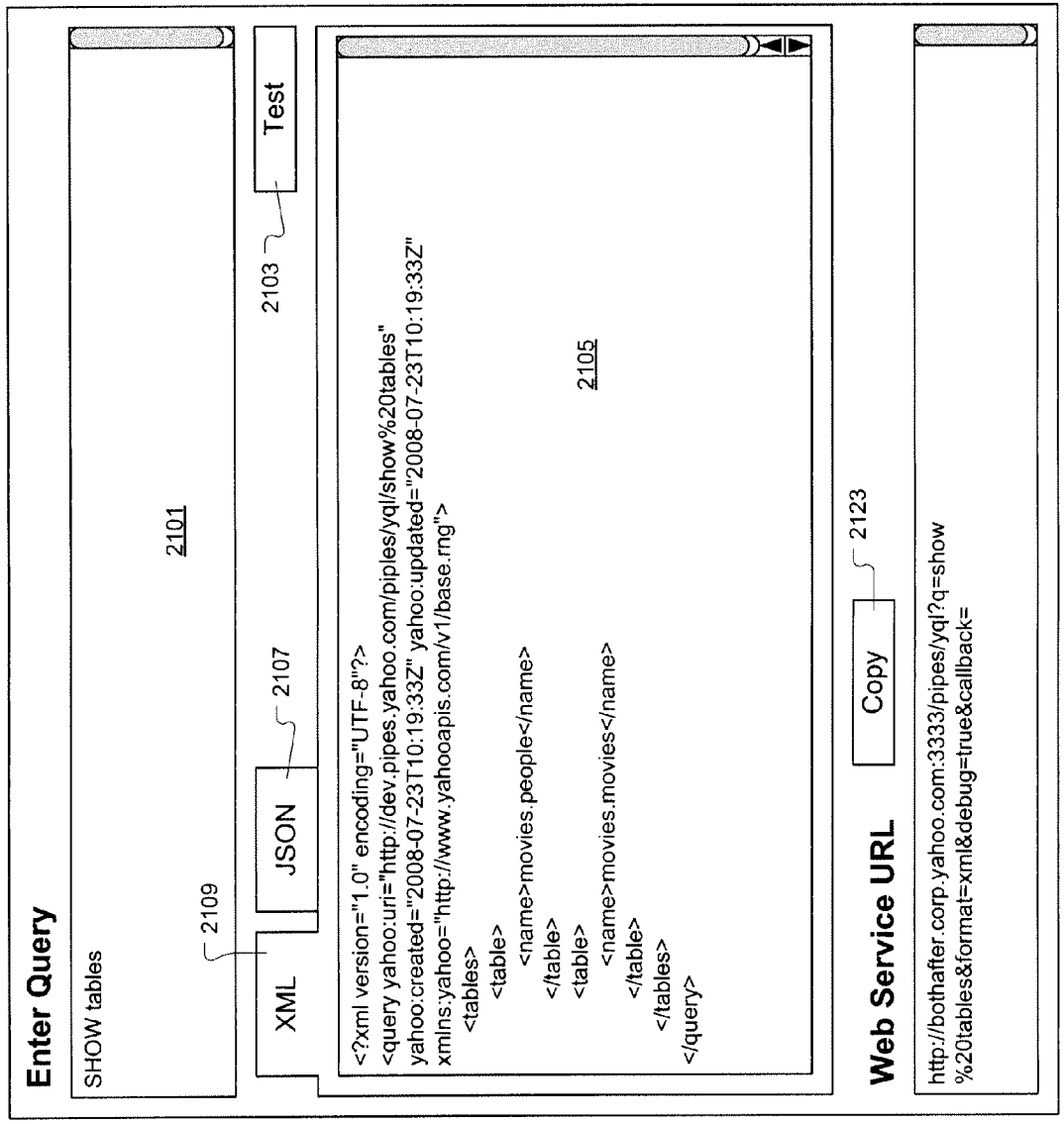
FIG. 22 shows the QL GUI (without the sidebar display for clarity) with the XML selection control activated, in accordance with one embodiment of the present invention.

FIG. 22 shows the QL GUI (without the sidebar display for clarity) with the XML selection control 2109 activated, in accordance with one embodiment of the present invention. When the XML selection control 2109 is activated, the results data is displayed in the results display window 2105 in XML format. Activation of the XML selection control 2109 causes the controls specific to the JSON format to be removed from the current QL GUI display, such as the formatted view control 2111, the tree view control 2113, the callback entry window 2115, and the callback wrapping control 2117.

Figure 23:
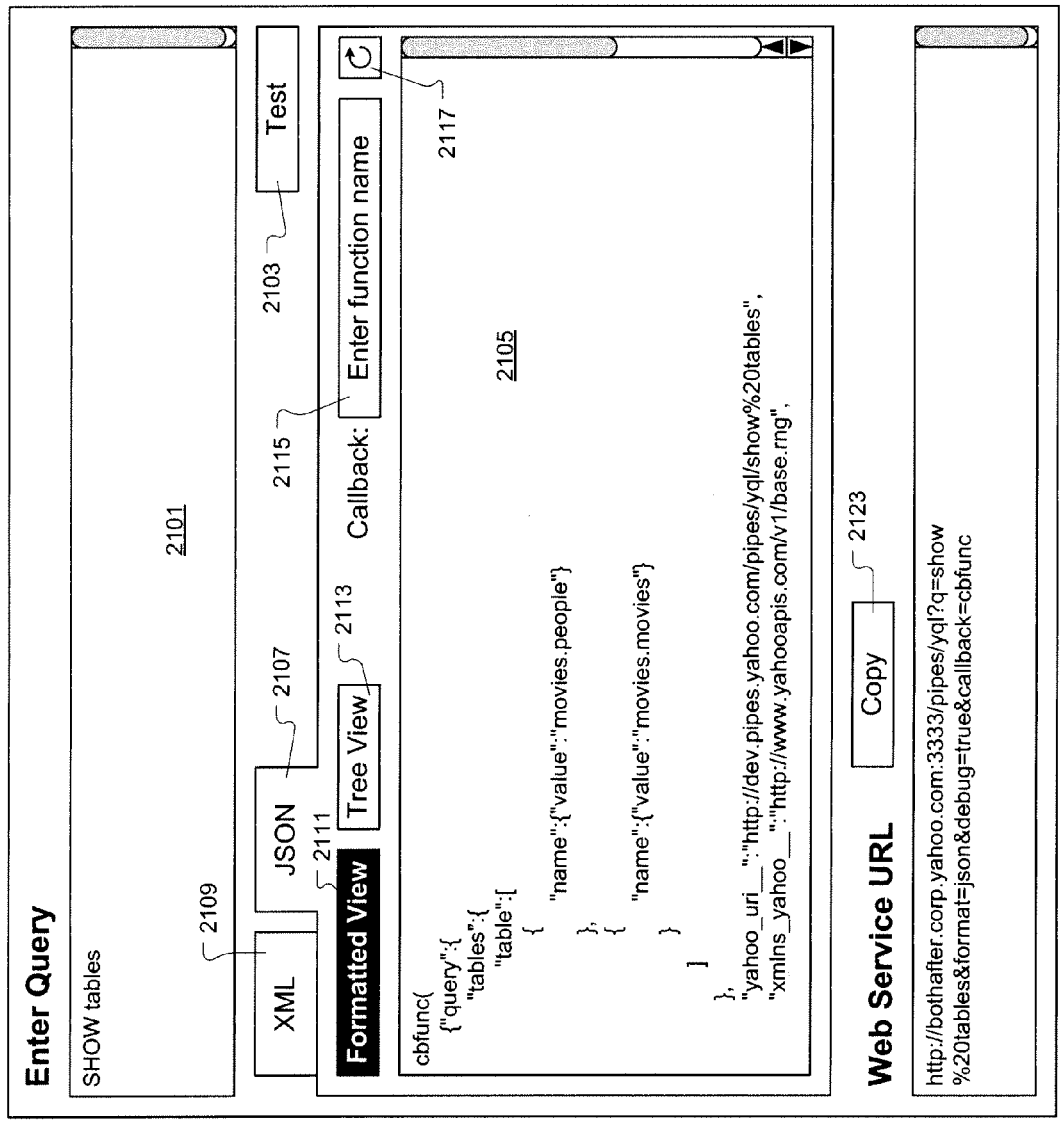
FIG. 23 shows the QL GUI (without the sidebar display for clarity) with the JSON selection control activated and the formatted view control activated, in accordance with one embodiment of the present invention.

FIG. 23 shows the QL GUI (without the sidebar display for clarity) with the JSON selection control 2107 activated and the formatted view control 2111 activated, in accordance with one embodiment of the present invention. When the JSON selection control 2107 is activated, the results data is displayed in the results display window 2105 in JSON format. As discussed above, the JSON formatted results can be displayed in either formatted view or tree view. In FIG. 23, the formatted view control 2111 is activated. Therefore, the results data is displayed in the JSON formatted manner in the results display window 2105.

Figure 24:
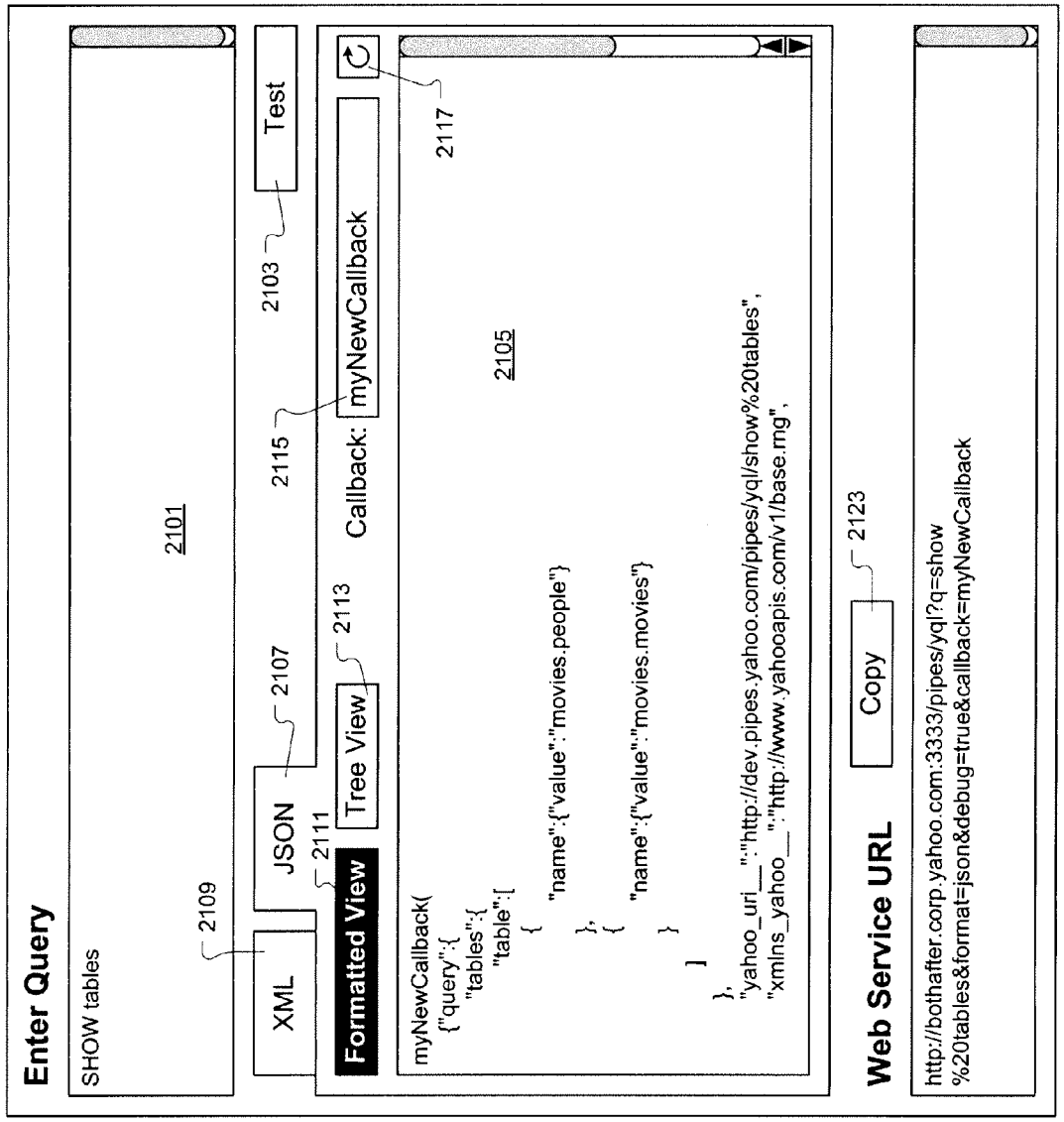
FIG. 24 shows the QL GUI of FIG. 23 with a function name "myNewCallback" entered in the callback entry window, following activation of the callback wrapping control, in accordance with one embodiment of the present invention.

Also, as discussed above, a callback function name can be entered in the callback entry window 2115. FIG. 24 shows the QL GUI of FIG. 23 with a function name "myNewCallback" entered in the callback entry window 2115, following activation of the callback wrapping control 2117, in accordance with one embodiment of the present invention. As shown in the results display window 2105, the JSON formatted results data is wrapped in a function called "myNewCallback."

Figure 25:
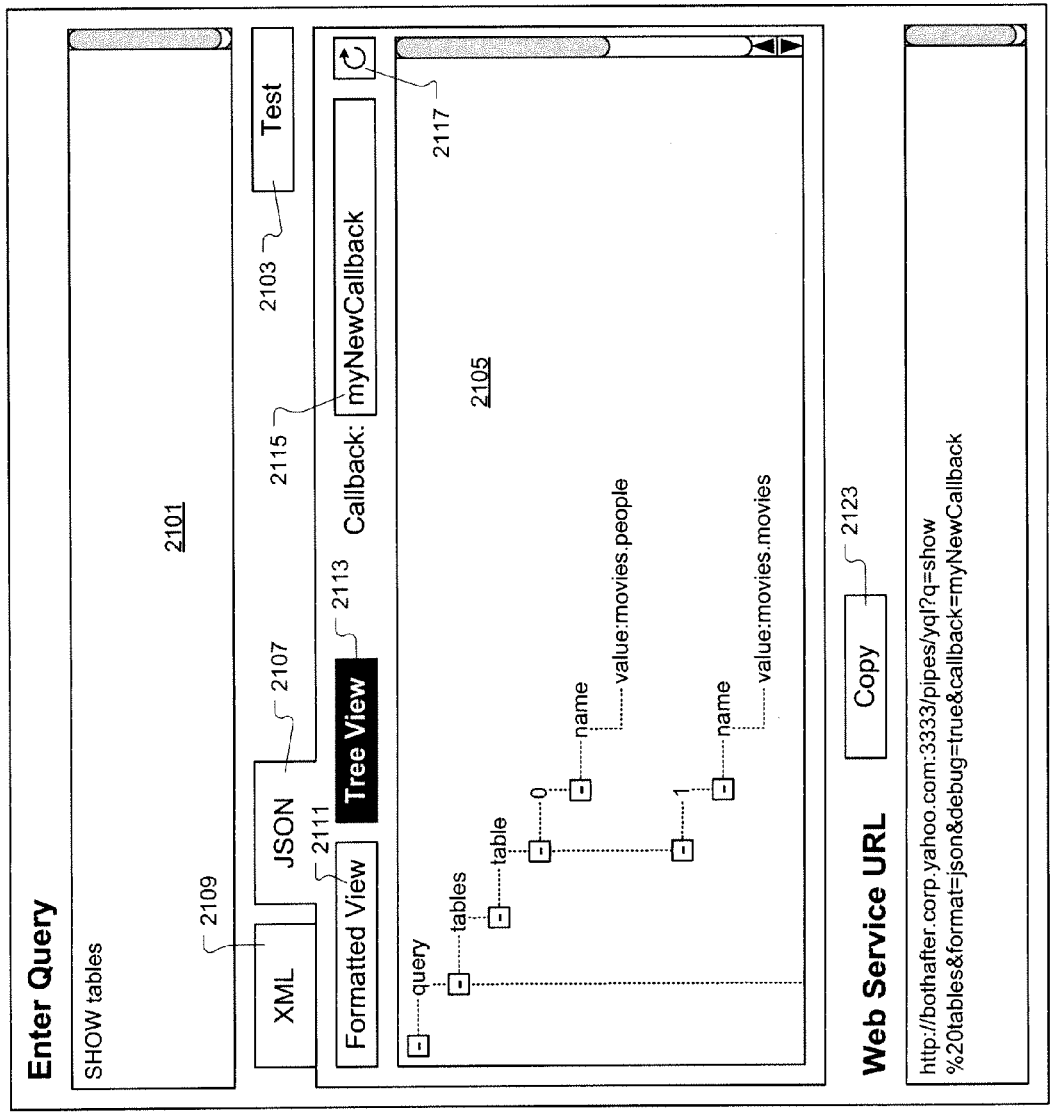
FIG. 25 shows the QL GUI (without the sidebar display for clarity) with the JSON selection control activated and the tree view control activated, in accordance with one embodiment of the present invention.

FIG. 25 shows the QL GUI (without the sidebar display for clarity) with the JSON selection control 2107 activated and the tree view control 2113 activated, in accordance with one embodiment of the present invention. The results data is displayed in a tree view format in the results display window 2105. The tree view format displays the JSON results in a hierarchical manner, wherein result table rows are expressed as JSON objects, and result table columns are expressed as JSON name-value pairs.

FIG. 26 shows the QL GUI (without the sidebar display for clarity) upon discovery of a query error, in accordance with one embodiment of the present invention. As mentioned above, a query can be found to be in error by having incorrect syntax or by referencing parameters or key words that are not allowed or present in a specified QL table. If the query is found to be in error, the QL GUI displays an error window 2601 within which the query error is identified and described. In one embodiment, the error window 2601 is only displayed when an error exists in the currently executed query. Upon display of the error window 2601, the other portions of the QL GUI are resized to make room for display of the error window 2601. Additionally, when a query error is discovered, a description of the query error is also specified in the results data shown in the results display window.

It should be understood that the particular visual format of the QL GUI as described herein is one of many embodiments that can be defined to visually convey the content of the QL GUI. Therefore, it should be understood that in one embodiment, the QL GUI is defined on a component level to include the following:

a query entry component, analogous to the query entry window 2101 and execution control 2103, a query checking module defined to check a syntax and parameter specification of the QL statement present in the query entry component, a results data display component, analogous to the results display window 2105 and associated controls, and a QL Web Service URL conveyance component, analogous to the URL display window 2121 and/or copy control 2123.

Additionally, in some embodiments, the QL GUI can be defined to include one or more of number of convenient tools for developer use, such as the recent queries window 2125, the example queries window 2127, and the available data sources window 2129. It should be understood that although the above-mentioned developer conveniences are displayed in a sidebar in the QL GUI of FIG. 21A, other embodiments may display any of the developer conveniences in another location within the QL GUI or within one or more separate windows outside of the QL GUI.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data may be processed by other computers on the network, e.g. a cloud of computing resources.

The embodiments of the present invention can also be defined as a machine that transforms data from one state to another state. The data may represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

The invention can also be embodied as computer readable code on a computer readable medium. The computer readable medium may be any data storage device that can store data, which can thereafter be read by a computer system. Examples of the computer readable medium include hard drives, network attached storage (NAS), read-only memory, random-access memory, FLASH based memory, CD-ROMs, CD-Rs, CD-RWs, DVDs, magnetic tapes, and other optical and non-optical data storage devices. The computer readable medium can also be distributed over a network coupled computer systems so that the computer readable code may be stored and executed in a distributed fashion.

Although the method operations of various embodiments disclosed herein were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overall operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A non-transitory data storage device having program instructions stored thereon for a graphical user interface for a system for querying web data, comprising:
   program instructions for a query entry component visually rendered in a display of computer system, wherein the query entry component is defined to receive textual input of a query language (QL) statement, wherein the QL statement identifies one or more QL tables associated with one or more web data sources, wherein each of the one or more QL tables includes binding data which includes instructions for a QL web service on creating a universal resource locator (URL) to access and retrieve data from a web data source, and for interfacing with the web data source and interacting with the web data source in order to query the web data source for specific data present at the web data source, and wherein the binding data of each of the one or more QL tables informs the QL web service as to what types of data are present within the web data source;
   program instructions for a results data display component visually rendered in the display, wherein the results data display component is defined to visually display results data obtained from execution of the QL statement present in the query entry component; and
   program instructions for a QL web service URL conveyance component visually rendered in the display, wherein the QL web service URL conveyance component is defined to visually and electronically convey a QL web service URL defined to access one or more QL tables identified in the QL statement through the Internet and retrieve direction from the one or more QL tables regarding access and retrieval of data from the one or more web data sources associated with the one or more QL tables identified in the QL statement.

2. The data storage device as recited in claim 1, wherein the QL statement is defined to specify one or more actions to be performed on the one or more web data sources.

3. The data storage device as recited in claim 1, wherein the results data is generated by operating a QL web service to execute the QL web service URL.

4. The data storage device as recited in claim 1, wherein the results data display component is defined to visually display the results data in either an Extensible Markup Language (XML) format or a JavaScript Object Notation (JSON) format.

5. The data storage device as recited in claim 4, wherein the results data display component is defined to display the results data in the JSON format in either a formatted view or a tree view.

6. The data storage device as recited in claim 5, wherein the tree view includes visual display of the JSON results in a hierarchical manner, wherein result table rows are expressed as JSON objects, and result table columns are expressed as JSON name-value pairs.

7. The data storage device as recited in claim 4, wherein the results data display component includes a callback entry component and a callback wrapping control, wherein activation of the callback wrapping control wraps the results data in the JSON format in a function having a function name present in the callback entry component.

8. The data storage device as recited in claim 1, wherein the query entry component includes an execution control that when activated causes execution of the QL statement present in the query entry component.

9. The data storage device as recited in claim 1, wherein the QL web service URL conveyance component includes a copy control that when executed stores the QL web service URL in a copy buffer.

10. The data storage device as recited in claim 1, further comprising:
    program instructions for a query checking module defined to check a syntax and parameter specification of the QL statement present in the query entry component, and visually identify any errors found in the QL statement present in the query entry component.

11. The data storage device as recited in claim 1, further comprising:
    program instructions for rendering a recent queries window defined to visually display a listing of recent queries entered through the query entry component, wherein activation of any recent query in the listing of recent queries causes the activated recent query to be re-instantiated within the query entry component.

12. The data storage device as recited in claim 1, further comprising:
    program instructions for rendering an example queries window defined to visually display a listing of example queries, wherein activation of any example query in the listing of example queries causes the activated example query to be instantiated within the query entry component.

13. The data storage device as recited in claim 1, further comprising:
    program instructions for rendering an available data sources window defined to visually display a listing of available QL tables and provide a respective description for each listed QL table.

14. A method for operating a graphical user interface (GUI) for a system for querying web data, comprising:
    entering a query language (QL) statement in a query entry window of the GUI, wherein the QL statement identifies one or more QL tables associated with one or more web data sources, wherein each of the one or more QL tables includes binding data which includes instructions for a QL web service on creating a universal resource locator (URL) to access and retrieve data from a web data source, and for interfacing with the web data source and interacting with the web data source in order to query the web data source for specific data present at the web data source, and wherein the binding data of each of the one or more QL tables informs the QL web service as to what types of data are present within the web data source;
    generating a QL web service URL defined to execute the QL statement, the QL web service URL defined to access one or more QL tables identified in the QL statement through the Internet and retrieve direction from the one or more QL tables regarding access and retrieval of data from the one or more web data sources associated with the one or more QL tables identified in the QL statement;

executing the QL statement through a QL web service underlying the graphical user interface via the generated QL web service URL;

displaying results data generated by execution of the QL statement in a results display window of the GUI; and displaying the QL web service URL defined to execute the QL statement in a URL display window of the GUI.

15. The method of claim 14, further comprising:
selecting a format for display of the results data by activating a control in the GUI.

16. The method of claim 15, wherein the selected format is either an Extensible Markup Language (XML) format.

17. The method of claim 15, wherein the selected format is a JavaScript Object Notation (JSON) format.

18. The method of claim 17, wherein the results data is displayed in the JSON format in either a formatted view or a tree view.

19. The method of claim 18, wherein the tree view includes visual display of the results data in a hierarchical manner, wherein result table rows are expressed as JSON objects, and result table columns are expressed as JSON name-value pairs.

20. The method of claim 14, further comprising:
storing each executed QL statement in a listing of recent queries; and displaying the listing of recent queries in the GUI.

21. The method of claim 14, further comprising:
displaying a listing of available data sources; and upon selection of an available data source in the displayed listing of available data sources, visually displaying a description of the selected available data source.

22. The method of claim 14, further comprising:
displaying a listing of example queries; and upon selection of an example query in the displayed listing of example queries, entering a QL statement of the selected example query in the query entry window of the GUI.

* * * * *